(12) United States Patent
Kimura et al.

(10) Patent No.: US 9,789,624 B2
(45) Date of Patent: Oct. 17, 2017

(54) CUTTING DEVICES

(71) Applicant: MAKITA CORPORATION, Anjo-shi, Aichi (JP)

(72) Inventors: Yoshihiro Kimura, Anjo (JP); Syuji Aoyama, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 295 days.

(21) Appl. No.: 14/608,830

(22) Filed: Jan. 29, 2015

(65) Prior Publication Data

US 2015/0209975 A1   Jul. 30, 2015

(30) Foreign Application Priority Data

Jan. 30, 2014 (JP) .................................. 2014-015257
Dec. 18, 2014 (JP) .................................. 2014-256185

(51) Int. Cl.
  *B23D 45/02* (2006.01)
  *B27B 5/32* (2006.01)
  *B23D 45/04* (2006.01)

(52) U.S. Cl.
  CPC ............. *B27B 5/32* (2013.01); *B23D 45/028* (2013.01); *B23D 45/042* (2013.01); *Y10T 83/7693* (2015.04); *Y10T 83/9377* (2015.04)

(58) Field of Classification Search
  CPC . B23D 45/042; B23D 45/028; Y10T 83/9377; Y10T 83/7693; Y10T 29/49963; Y10T 83/9464; B27B 5/32; B26D 7/2621; F16B 39/32; F16B 39/282
  USPC .... 83/471, 698.41, 571, 666, 490, 581, 573, 83/664; 29/525.11; 411/542, 148, 150, 411/149
  See application file for complete search history.

(56) References Cited

U.S. PATENT DOCUMENTS

| 7,363,843 B2 * | 4/2008 | Chiu ........................ B27B 5/32 83/490 |
| 2002/0028644 A1 | 3/2002 | Rudolf et al. |
| 2010/0040474 A1 * | 2/2010 | Takahashi ............. B24B 45/006 416/219 R |
| 2012/0118122 A1 | 5/2012 | Sasaki |
| 2014/0182442 A1 * | 7/2014 | Hortling .................... B27B 5/32 83/698.41 |
| 2016/0288359 A1 * | 10/2016 | Patrick ...................... B27B 5/32 |

FOREIGN PATENT DOCUMENTS

| DE | 41 39 073 A1 | 6/1992 |
| DE | 43 36 620 A1 | 5/1995 |
| DE | 203 17 793 U1 | 4/2004 |
| DE | 20 2007 001 946 U1 | 6/2008 |
| DE | EP 2006058 A1 * | 12/2008 ........... B24B 45/006 |
| EP | 0 319 813 A2 | 6/1989 |
| JP | 2011016209 A | 1/2011 |

OTHER PUBLICATIONS

Sep. 24, 2015 Office Action issued in German Patent Application No. 10 2015 001 146.4.

\* cited by examiner

*Primary Examiner* — Ghassem Alie
(74) *Attorney, Agent, or Firm* — Oliff PLC

(57) ABSTRACT

A cutting device may include a friction reducing device arranged in an operational force transmission path between an operation member and a fixing device that can fix a circular cutter to a rotational shaft of a cutting unit.

20 Claims, 17 Drawing Sheets

CUTTING DEVICES

This application claims priorities to Japanese patent application serial numbers 2014-015257 and 2014-256185, the contents of which are incorporated herein by reference.

BACKGROUND OF THE INVENTION

Field of the Invention

Embodiments of the present disclosure relate to cutting devices having rotational shafts to which circular rotary cutters can be mounted.

Description of the Related Art

Known stationary or table-type cutting devices include a cutting unit having a rotational shaft to which a circular rotary cutter, such as a circular rotary blade and a circular grinding wheel designed for cutting, can be mounted. The cutting unit may be vertically moved for cutting a workpiece by the rotary cutter. An electric motor may be used for rotating the rotational shaft. The rotational shaft may be provided with a fixing device for fixedly mounting the rotary cutter to the rotational shaft. Japanese Laid-Open Patent Publication No. 2011-16209 discloses a fixing device that may fix a rotary cutter to a rotational shaft while inhibiting loosening of the fixation of the rotary cutter during rotation of the rotational shaft.

It may be necessary for the fixing device that the rotary cutter can be firmly fastened to the rotational shaft. Therefore, for the purpose of fastening and loosening the rotary cutter to and from the rotational shaft, a separate operating tool is needed which helps to operate the fixing device. Because the separate operating tool is needed, the operator must take the operating tool out of a tool box or the like and return the operating tool to the tool box after the operation of the fixing device. Therefore, the operation for exchanging the rotary cutter is rather troublesome to perform. Further, because the operating tool is needed, the operator is encumbered with the burden of storage of the operating tool, which is rather inconvenient.

Therefore, there has been a need in the art for enabling an operator to mount and remove a rotary blade without need of a separate operating tool.

SUMMARY OF THE INVENTION

In one aspect according to the present teachings, a cutting device may include a friction reducing device arranged in an operational force transmission path between an operation member and a fixing device that can fix a circular cutter to a rotational shaft of a cutting unit.

DETAILED DESCRIPTION OF THE INVENTION

Figure 1:
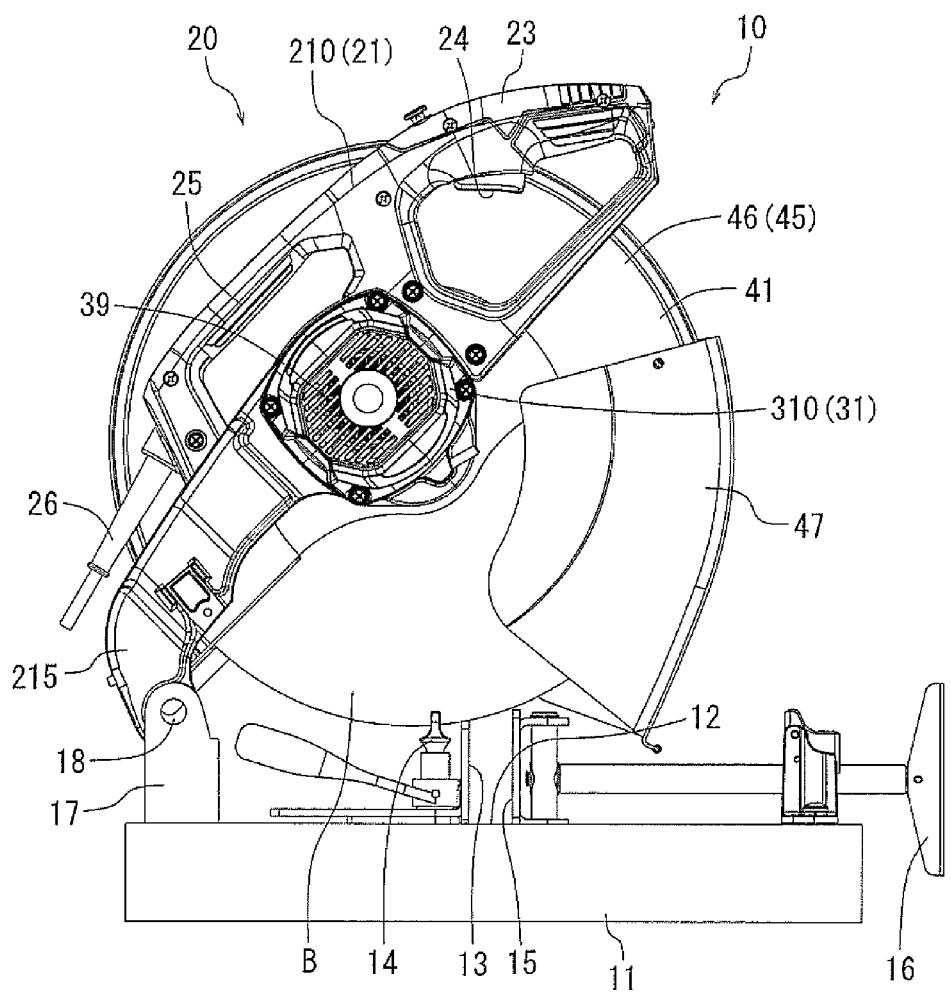
FIG. 1 is a left side view of a cutting device according to a first embodiment.
Figure 1:
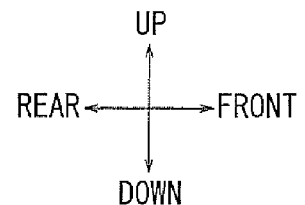

In one embodiment, a cutting device may include a cutting unit having a rotational shaft, a fixing device configured to fixedly attach a circular cutter to the rotational shaft, and an operation device coupled to the fixing device. The operation device may include an operation member and a friction reducing device. The operation member may apply an operational force to the fixing device for fixation of the circular cutter to the rotational shaft and for releasing fixation of the circular cutter to the rotational shaft. The friction reducing device may be arranged in an operational force transmission path between the operation member and the fixing device. The friction reducing device may reduce a frictional force produced between the operation member and the fixing device when the operation member applies the operational force to the fixing device.

With this arrangement, when the operation member is operated to apply the operational force to the fixing device for fixation or for releasing fixation of the circular cutter, the friction reducing device may reduce the frictional force applied by the operation member to the fixing device. Therefore, the operation member can be easily operated by a manual operation without need of use of a separate tool.

The operation member may be rotatable relative to the rotational shaft and movable relative to the rotational shaft in an axial direction toward and away from the fixing device as the operation member rotates. In such a case, the friction reducing device may be a rolling bearing, such as a thrust needle bearing, arranged so as to oppose to the operation member in the axial direction. With this arrangement, the friction reducing device may reduce the frictional force that may be produced by the rotation of the operation member relative to the fixing device. In particular, by the user of the rolling bearing, it may be possible to minimize the size of the operation device in the axial direction. Therefore, the cutting device can be improved in terms of ease of handling.

In another embodiment, a cutting device may include a cutting unit having a rotational shaft, a fixing device configured to fixedly attach a circular cutter to the rotational shaft, an operation device coupled to the fixing device, and a cam device coupled to the operation member. The operation device may include an operation member rotatable about an axis of the rotational shaft. When the operation member rotates in a first direction, the cam device may apply an operational force to the fixing device for fixation of the circular cutter. When the operation member rotates in a second direction opposite to the first direction, the cam device may release the operational force applied to the fixing device.

With this arrangement, due to the cam action of the cam device, the fixing device can receive a sufficient operational force for firmly fixing the circular cutter by the manual rotation of the operation member without need of use of a separate tool. In addition, it is possible to easily release the fixation of the circular cutter by the manual operation.

In a further embodiment, a cutting device may include a cutting unit having an rotational shaft, a fixing device configured to fixedly attach a circular cutter to the rotational shaft, and an operation device. The operation device may include an operational force applying device configured to be capable of applying an operational force to the fixing device for fixation of the circular cutter to the rotational shaft and for releasing fixation of the circular cutter to the rotational shaft. The cutting unit may further include a case section configured to cover the circular cutter. The operational force applying device may include an operation member supported by the case section so as to be movable relative to the case section for applying the operational force to the fixing device.

With this arrangement, the operator can operate the operation member for applying the operational force to the fixing device from the outer side of the case section without need of use of a separate tool.

In a further embodiment, a cutting device may include a cutting unit having an rotational shaft, a fixing device configured to fixedly attach a circular cutter to the rotational shaft, and an operation device coupled to the fixing device. The operation device may be configured to apply an operational force to the fixing device for fixation of the circular cutter to the rotational shaft. The operation device may include a thread member, an engaging operation device and a rotational operation device. The thread member may threadably engage with the rotational shaft so as to be rotatable about an axis of the rotational shaft. The thread member may apply the operational force to the fixing device for fixing the circular cutter to the rotational shaft when the thread member rotates in a fixing direction. On the other hand, the thread member applies the operational force to the fixing device for releasing fixation of the circular cutter to the rotational shaft when the thread member rotates in a releasing direction opposite to the fixing direction. The engaging operation device may releasably engage with the thread member for preventing rotation of the thread member. The rotation operation device may be operable to rotate the rotational shaft relative to the thread member when the rotation of the thread member is prevented by the engaging operation device.

With this arrangement, the engaging operation device and the rotation operation device of the operation device may be operable independently of each other and may be located at different positions. Therefore, it may be possible to avoid an increase in size of the cutting unit at a local position. Eventually, the cutting unit can be easily handled.

Various embodiments will now be described with reference to the drawings.

[First Embodiment]

In the following, embodiments of the cutting device according to the present teachings will be described. First, a cutting device 10 according to a first embodiment will be described with reference to FIGS. 1 through 3. The cutting device 10 may be placed on the ground or a table, and may be used with a circular cutter B mounted to a rotational shaft 42. In this embodiment, the circular cutter B may be a grinding wheel designed for use with a cutting operation. The cutting device 10 may generally include a base 11 and a cutting unit 20.

On a workpiece support surface 12, which is the upper surface of the base 11, there may be provided a fence 13 and a vise plate 15. A workpiece may be placed on the workpiece support surface 12. The fence 13 may support the workpiece from the rear side and the vise plate 15 may support the workpiece from the front side. The fence 13 may be fixed to the workpiece support surface 12 by the operation of a fixation lever 14. The fence 13 may be free to move relative to the workpiece support surface 12 when the fixation lever 14 is operated for releasing the fixation. The vise plate 15 may be fixed to the workpiece support surface 12 by the operation of a fixation handle 16. The vise plate 15 may be free to move relative to the workpiece support surface 12 when the fixation handle 16 is operated for releasing the fixation.

At the rear end portion of the workpiece support surface 12, there may be provided a support connection portion 17 for connecting and supporting the cutting unit 20. The support connection portion 17 may be formed to have a shape like a lug protruding upwards from the workpiece support surface 12. At the upper end portion of the support connection portion 17, there may be provided a pivotal support shaft 18. The pivotal support shaft 18 may pivotally support a pivotal portion 215 of the cutting unit 20.

Figure 3:
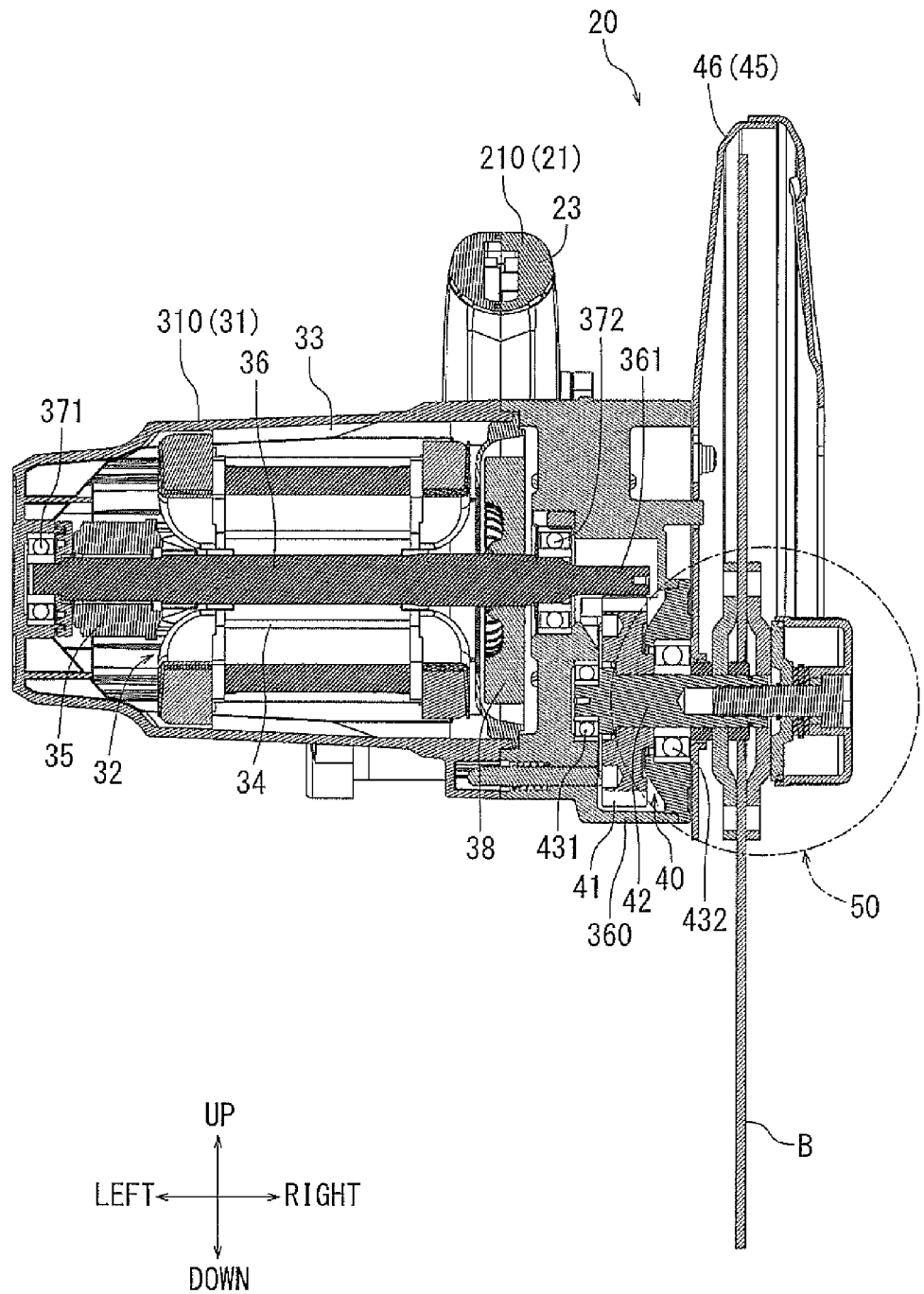
FIG. 3 is a sectional view illustrating the internal structure of a cutting unit of the cutting device.

As shown in FIG. 3, the cutting unit 20 may include a handle section 21, a motor section 31, and a blade case section 45. The motor section 31 may be arranged on the left-hand side of the handle section 21. The blade case section 45 may be arranged on the right-hand side of the handle section 21. The motor section 31 may be arranged at a position opposing a middle portion with respect to the length in the front-rear direction of the handle section 12.

Figure 2:
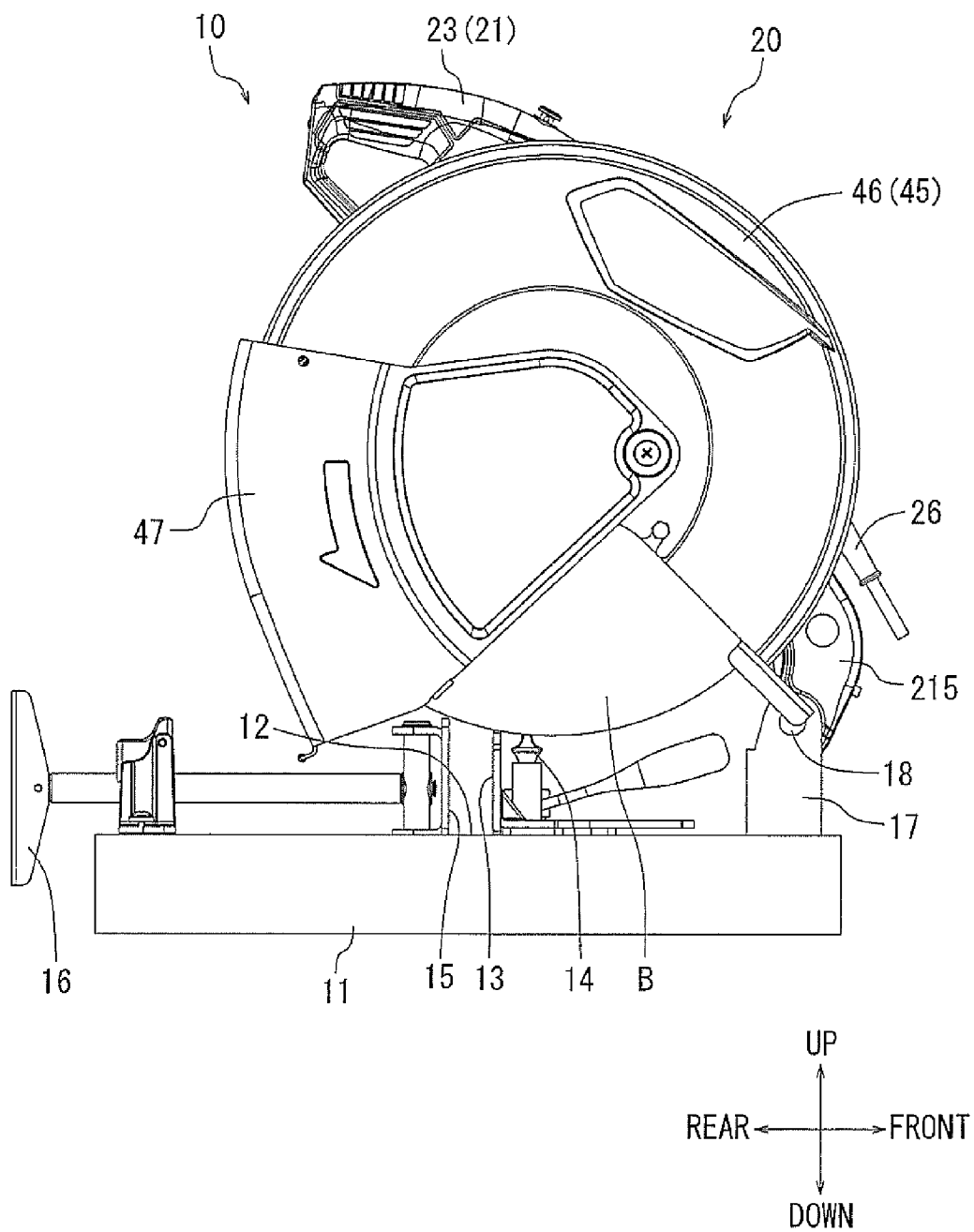
FIG. 2 is a right side view of the cutting device.

As shown in FIG. 3, the handle section 21 may include a handle housing 210 configured to be able to be grasped by the operator. A gear unit 40 may be disposed within a gear housing 360 that will be explained later. The pivotal portion 215 may pivot about the pivotal support shaft 18 of the support connection portion 17 arranged on the workpiece support surface 12. In this way, the cutting unit 20 including the handle section 21 can pivot vertically together with the pivotal portion 215. As shown in FIG. 1, the handle section 21 may be provided with a first grip portion 23 and a second grip portion 25 each constructed so as to be capable of being grasped by a hand of the operator. The first grip portion 23 may be arranged on the front side with respect to the motor section 31 and may be provided mainly for the purpose of downwardly pivoting the cutting unit 20 for the cutting operation. The first grip portion 23 may include an operation trigger 24 used for operating the cutting device 10. The second grip portion 25, which is arranged on the upper side with respect to the motor section 31, may be provided mainly for the purpose of upwardly pivoting the cutting device 10. Further, at the rear side of the second grip portion 25, there may be provided a power source cord 26 that can be connected to a power source outlet.

As shown in FIG. 3, the motor section 31 may include a motor housing 310. The motor housing 310 may be formed integrally in continuity with the handle housing 210. An electric brush motor 32 may be accommodated within the motor housing 310. The brush motor 32 may serve as a power source of the cutting device 10 for rotating the circular cutter B. The brush motor 32 may include a field coil 33, an armature 34, and a commutator 35. The armature 34 may be mounted to a rotation drive shaft 36 that is rotatably supported by bearings 371 and 372. The armature 34 may rotate together with the rotation drive shaft 36 relative to the field coil 33.

The field coil 33, the commutator 35, and the bearings 371 and 372 may be supported by the motor housing 310 and the gear housing 360. Further, a centrifugal type cooling fan 38 may be mounted to the rotation drive shaft 36 for rotation therewith. As the cooling fan 38 rotates together with the rotation drive shaft 36, the external air may be drawn into the motor housing 310 via an intake hole device 39 shown in FIG. 1. As shown in FIG. 3, an input gear 361 may be mounted to the input end portion (right-hand end portion) of the rotation drive shaft 36. The input gear 361 may be in mesh with a speed reduction gear 41 of the gear unit 40 supported by the gear housing 360.

As shown in FIG. 3, the speed reduction gear 41 may be mounted to the rotational shaft 42 that serves as a rotation shaft of the gear unit 40. The rotational shaft 42 may be rotatably supported by bearings 431 and 432 that may be mounted to the gear housing 360. The rotational shaft 42 may rotate together with the speed reduction gear 41 that is in mesh with the input gear 361. Therefore, the rotation of the rotation drive shaft 36 of the motor section 31 may be reduced before being transmitted to the rotational shaft 42 that rotates together with the circular cutter B. In order to facilitate the mounting of the circular cutter B, the rotational shaft 42 may protrudes into the interior of the blade case section 45 from within the gear housing 360. The portion of this rotational shaft 42 protruding into the interior of the blade case section 45 may serve as a blade mounting portion to which the circular cutter B is mounted.

The blade case section 45 may generally include a blade case main body 46, and a case cover 47. The blade case main body 46 may be formed so as to cover the outer periphery of the circular cutter B mounted to the rotational shaft 42. The blade case main body 46 may be mounted to the gear housing 360 by screws or any other fasteners so as to be supported by the gear housing 360. The blade case main body 46 may be a metal molded product and may be formed to have a configuration covering substantially the upper half of the circular cutter B. The case cover 47 may be pivotally mounted to the blade case main body 46 and may be formed of a sheet metal component. The case cover 47 may pivot as it contacts with the workpiece when the cutting unit 20 pivots downward. The case cover 47 may serve to suppress scattering of the cutting chips (cutting powder) generated from the workpiece cut by the circular cutter B.

The rotational shaft 42 may be provided with a cutter mounting device 50 for fixedly retaining the circular cutter B. The cutter mounting device 50 may include a clamp device 51 and a operation device 61. The clamp device 51 may serve as a fixing device for fixing the circular cutter B to the rotational shaft 42. The operation device 61 may be manually operated for operating the clamp device 51, so that the circular cutter B can be fixed to the rotational shaft 42. The clamp device 51 may generally include a spacer 52, an axially inner flange member 53, and an axially outer flange member 55. In fixing the circular cutter B to the rotational shaft 42, the spacer 52 may serve to keep the circular cutter B at an appropriate distance from the gear housing 360, so that the circular cutter B can be positioned at an appropriate position inside the blade case section 45. The inner flange member 53 may be mounted to the spacer 52 such that it can rotate together with the rotational shaft 42 but is prevented from moving in the axial direction. The inner flange member 53 may have a substantially circular shape so as to be capable of contacting with the inner side (left-hand side) surface of the circular cutter B in face-to-face contact relationship therewith. Similarly, the outer flange member 55 may have a substantially circular shape so as to be capable of contacting with the outer side (right-hand side) surface of the circular cutter B in face-to-face contact relationship therewith. The inner flange member 53 and the outer flange member 55 may be brought to contact with the inner and outer (left and right) surfaces of the circular cutter B so as to clamp the circular cutter B therebetween, so that the circular cutter B can be fixed to the rotational shaft 42. As will be explained later, the operation device 61 may apply an operational force to the clamp device 51 for fixing the circular cutter B to the rotational shaft 42 by the inner flange member 53 and the outer flange member 55. The outer flange member 55 and the circular cutter B may be mounted to the rotational shaft 42 such that it can rotate together with the rotational shaft 42. However, the outer flange member 55 and the circular cutter B may rotate together with inner flange member 53 and also together with the rotational shaft 42 when the operational force is applied by the operation device 61.

The operation device 61 may include a thread mechanism that enables movement of the operation device 61 in the axial direction relative to the rotational shaft 42. The thread mechanism may include a male thread portion and a female thread portion. The female thread portion may be provided on the rotational shaft 42 for engagement with the male thread portion. The female thread portion may be a female thread hole 49 formed in the rotational shaft 42. The female thread hole 49 may extend in the axial direction starting from the outer end surface (right-hand side end surface) of the rotational shaft 42.

Figure 4:
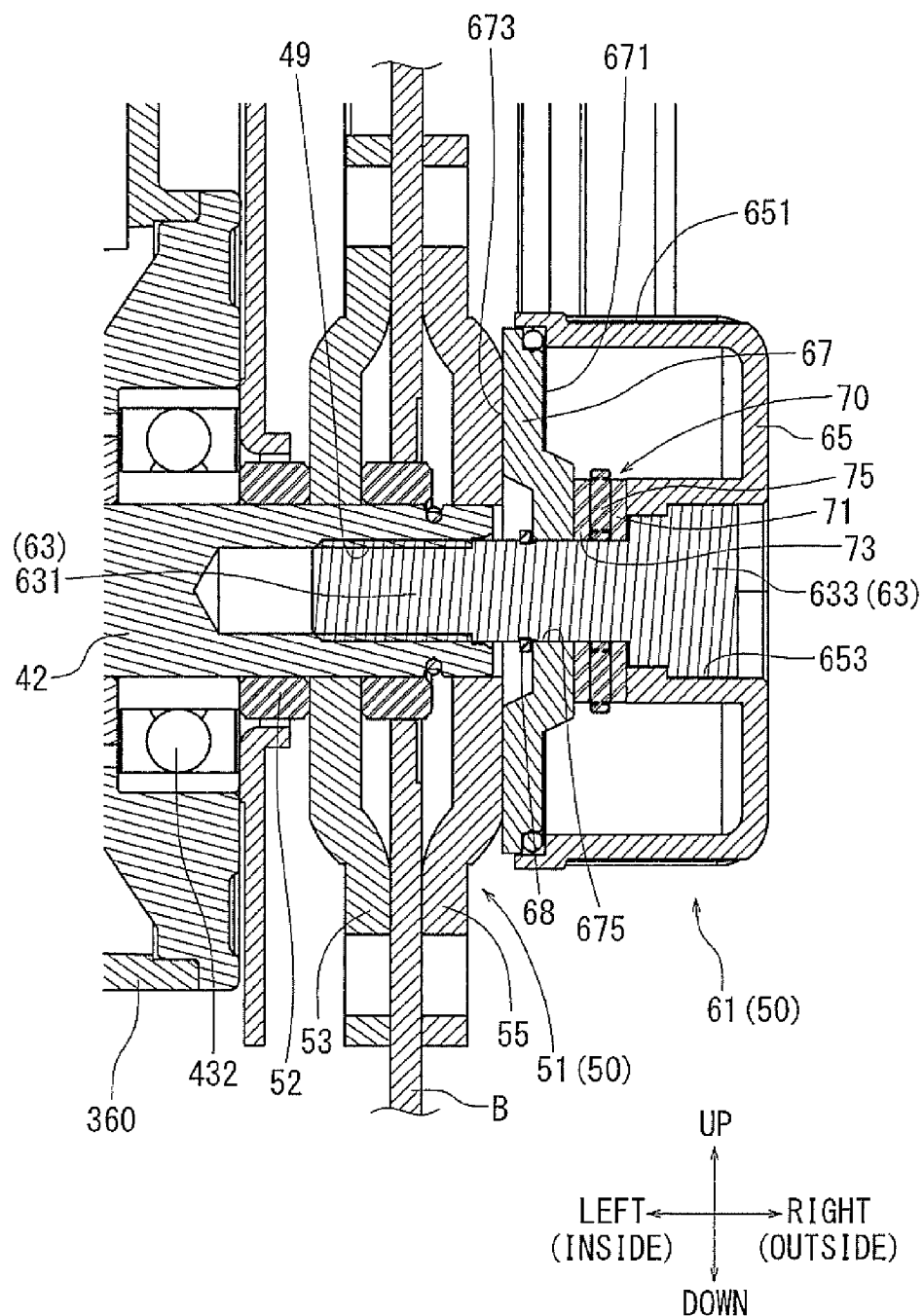
FIG. 4 is an enlarged sectional view of a portion of FIG. 3 showing a fixing device and an operation device for operating the fixing device of the cutting unit.

As shown in FIG. 4, the operation device 61 may generally include a fastening bolt 63, an operation knob 65, a pressing flange member 67, and a bearing 70. The fastening bolt 63 may be a hexagonal bolt having a male thread portion 631 and an engagement head portion 633. The engagement head portion 633 may have a hexagonal prism shape for facilitating rotation of the fastening bolt 63. The male thread portion 631 may serve as the male thread portion for engagement with the female thread hole 49 of the rotational shaft 42. In this embodiment, the male thread portion 631 may move in a fastening direction for fastening into the female thread hole 49 as it is turned to the right. On the other hand, the male thread portion 631 may move in a loosening direction for loosening from the female thread hole 49 as it is turned to the left. The rotational direction of the rotational shaft 42 or the rotational direction the circular cutter B may be a left-hand direction that is opposite to the turning direction of the male thread portion 631 for movement in the fastening direction.

The engagement head portion 633 of the fastening bolt 63 may engage an engagement recess 653 formed in the operation knob 65, so that the fastening bolt 63 and the operation knob 65 can rotate together. More specifically, when the operation knob 65 is turned to the right, the fastening bolt 63 may move in the fastening direction together with the operation knob 65. As a result, the knob 65 may force to move the pressing flange member 67 in the fastening direction. Conversely, when the operation knob 65 is turned to the left, the fastening bolt 63 may move in the loosening direction together with the operation knob 65. In this way, the operation knob 65 may move toward the pressing flange member 67 as it is turned to the right, while the operation knob 65 may move away from the flange member 67 as it is turned to the left.

The operation knob 65 may have a shape facilitating manual turning operation by the operator. More specifically, The operation knob 65 may include an outer peripheral surface 651 having a substantially cylindrical shape, and an engagement recess 653 formed at a position corresponding to the rotation center of the outer peripheral surface 651. The outer peripheral surface 651 may have a shape like a dial. In order that the user can easily grasp and operate the operation knob 65, the outer peripheral surface 651 may be provided with a plurality of grooves 655 arranged in parallel with each other and spaced from each other in a circumferential direction. The engagement recess 653 may have a shape conforming to the shape the engagement head portion 633 of the fastening bolt 63 for engagement therewith. Therefore, when the operation knob 65 is rotated, the fastening bolt 63 is also integrally rotated to fasten the male thread portion 631 of the fastening bolt 63 into the female thread hole 49.

The pressing flange member 67 may be arranged on one side of the engaging head 633 of the fastening bolt 63. This pressing flange member 67 may be forced by the operation knob 65 to press against the flange member 55, so that circular cutter B can be clamped between the flange members 53 and 55. The pressing flange member 67 may be formed by appropriately bending a metal plate. The pressing flange member 67 may be forced to move by the operation knob 65 via a bearing 70 that will be described below. The pressing flange member 67 may be provided with a pressure receiving surface 671 on the side of the operation knob 65 and may be provided with a pressing surface 673 on the side of the flange member 55. Thus, the pressure receiving surface 671 may receive a pressing force from the operation knob 65, and the pressing surface 673 may apply a pressing force against the flange member 55. The pressing flange member 67 may have an insertion hole 675 through which the male thread portion 631 of the fastening bolt 63 can extend. A removal preventing ring 68 may be attached to the male thread portion 631 for preventing removal of the male thread portion 631 from the pressing flange member 67.

In this way, the pressing flange member 67 may serve as a pressing force applying portion for applying a pressing force, i.e., an operational force, to the clamp device 51 for fixing the circular cutter B to the rotational shaft 42. The operation knob 65 may serve as a manual operation portion for the movement the pressing flange membr 67 toward and away from the flange member 55 along the axis of the rotational shaft 42.

The bearing 70 may be provided between the operation knob 65 and the pressing flange member 67 and may serve as a friction reducing device for reducing a frictional force produced between the operation knob 65 and the pressing flange member 67 when the operation knob 65 rotates relative to the pressing flange member 67. The bearing 70 may be a thrust bearing that may be a rolling thrust bearing configured to axially abut the operation knob 65. More specifically, the bearing 70 may be a thrust needle bearing. The bearing 70 may include a rotation side abutment member 71 abutting the operation knob 65, a pressing side abutment member 73 abutting the pressing flange member 67, and a plurality of rolling pins 75 interposed between the rotation side abutment member 71 and the pressing side abutment member 73. The plurality of rolling pins 75 may serve as a plurality of needle-like rollers. Through the rolling movement of the rolling pins 75, the bearing 70 may reduce the friction force that may be produced between the rotation side abutment member 71 and the pressing side abutment member 73. In this way, the pressing flange member 67 may not receive a rotational force from the operation knob 65 but may move together with the operation knob 65 in the axial direction. Although not shown in the drawings, an appropriate ratchet mechanism or a lock mechanism may be provided for releasably lock the operation knob 65 or the pressing flange member 71 at a fastening position where the clamp device 61 firmly clamps the circular cutter B.

In the cutting device 10 of the first embodiment described above, the operation device 61 attached to the rotational shaft 42 has the pressing flange member 67 and the operation knob 65. The pressing flange member 67 may apply a pressing force to the clamp device 51 for fixing the circular cutter B to the rotational shaft 42, while the operation knob 65 may be manually operated for moving the pressing flange member 67 toward and away from the clamp device 51. The bearing 70 provided between the pressing flange member 67 and the operation knob 65 may reduce a frictional force that may be produced due to rotation of the operation knob 65 relative to the pressing flange member 67. As a result, without need of a separate operation tool, the operator can manually rotate the operation knob 65 for moving the pressing flange member 67 and fixing the circular cutter B to the rotational shaft 42. In this way, the circular cutter B can be mounted and removed without need of use of a separate operating tool.

In particular, by using a rolling bearing as the bearing 70, it may be possible to reduce in a satisfactory manner the friction force produce by the rotation of the operation knob 65. As a result, the manual operation of the operation knob 65 can be further facilitated. Furthermore, by using a thrust needle bearing as the bearing 70, the size in the axial direction of the bearing 70 can be minimized. As a result, it is possible to achieve a reduction in the size of the operation device 61, making it possible to enhance the operability of the cutting device 10.

[Second Embodiment]

Figure 5:
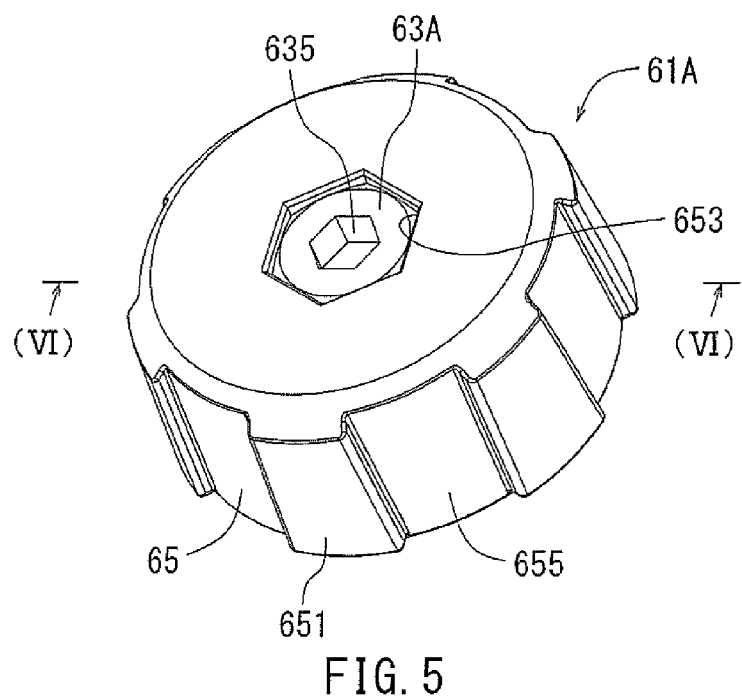
FIG. 5 is an enlarged perspective view of an operation device for operating a fixing device of a cutting device according to a second embodiment.
Figure 6:
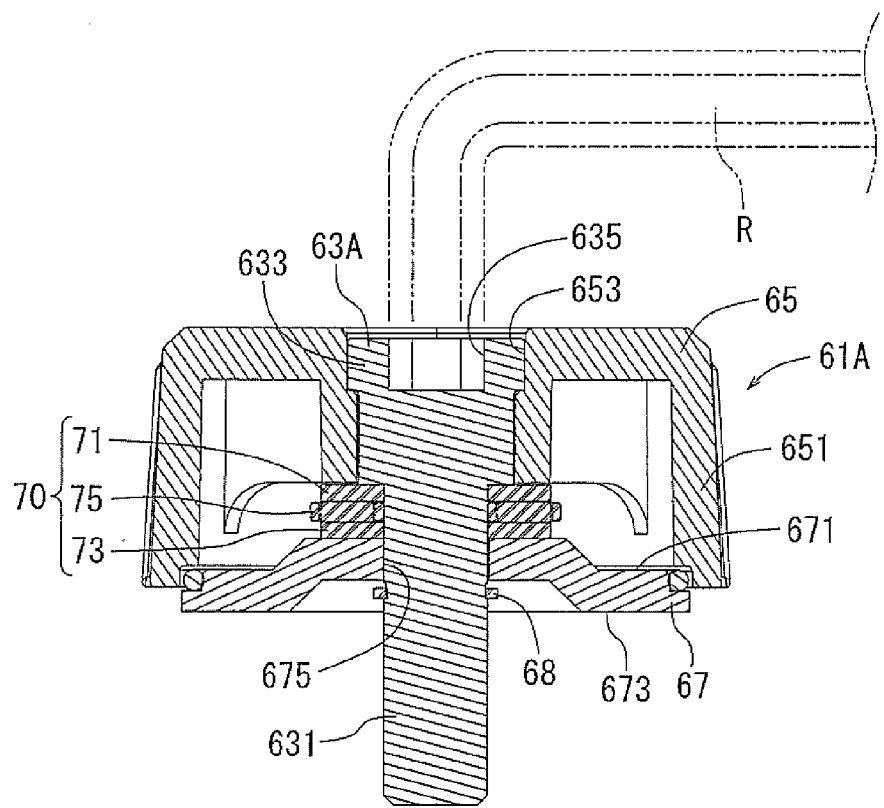
FIG. 6 is a sectional view taken along line (VI)-(VI) in FIG. 5.

A second embodiment will now be described with reference to FIGS. 5 and 6. The second embodiment is a modification of the cutting device 10 of the first embodiment and a cutting device of this embodiment is different from the cutting device 10 only for the construction of the fastening bolt 63 of the operation device 61 of the cutter mounting device 50. Reference numeral 61A denotes an operation device according to the second embodiment having a fastening bolt 63A in place of the fastening bolt 63 of the first embodiment. Thus, apart from this fastening bolt 63A, the operation device 61A may be substantially the same as the operation device 61 of the first embodiment. Therefore, in FIGS. 5 and 6, like members are given the same reference numerals as the first embodiment, and the description of these members will not be repeated.

The fastening bolt 63A of the second embodiment may be a hexagon-socket-headed bolt and may have at its head a hexagonal operation hole 635 for engagement with a hexagonal wrench R. Therefore, it is possible to fasten or loosen the fastening bolt 63A through the rotational operation of the hexagonal wrench key R. The operation device 61A of the second embodiment may provide substantially the same effect as the operation device 61 of the first embodiment described above. In addition, by engaging the hexagonal wrench R with the operation hole 635 and rotating the hexagonal wrench R, it may be also possible to fasten or loosen the pressing flange member 67.

[Third Embodiment]

A third embodiment will now be described with reference to FIGS. 7 through 10. A cutting device of the third embodiment is different from the cutting device 10 of the first embodiment only in the construction of the operation device 61 of the cutter mounting device 50. In FIGS. 7 through 10, reference numeral 61B denotes the operation device of the third embodiment, which is different from the operation device 61 of the first embodiment mainly in that a pull-out type operation portion 69 is provided.

In the description of the operation device 61B of the third embodiment, letter "B" is affixed to reference numerals indicating portions or elements having substantially the same functions as those of the operation device 61 of the first embodiment. The operation device 61B shown in FIGS. 7 through 10 may generally include a fastening bolt 63B, an operation knob 65B, a pressing flange member 67B, a bearing 70B, and the pull-out type operation portion 69. The fastening bolt 63B of the third embodiment may include a male thread portion 631B and an engagement head portion 633B functioning in the same manner as the corresponding portions of the first embodiment. The male thread portion 631B may threadedly engage the female thread hole 49 formed in the rotational shaft 42. Further, the engagement head portion 633B may be engaged with an engagement recess 653B of the operation knob 65B. Therefore, the fastening bolt 63B and the operation knob 65B can rotate together.

An outer peripheral surface 651B of the operation knob 65B may be provided with a plurality of grooves 655B arranged in parallel with each other and spaced from each other in a circumferential direction. The engagement recess 653B may have a shape conforming to the shape the engagement head portion 633B of the fastening bolt 63B for engagement therewith. Therefore, when the operation knob 65B is rotated, the fastening bolt 63B is also integrally rotated to fasten the male thread portion 631B of the fastening bolt 63B into the female thread hole 49 (not shown in FIGS. 7 through 10). A washer 79B may be interposed between the engagement head portion 633B of the fastening bolt 63B and a stepped part of the operation knob 65B formed inside thereof. The pressing flange member 67B may be arranged on one side of the operation knob 65B in a fastening direction of the fastening bolt 63B. The pressing flange member 67B may be forced to move in the axial direction by the operation knob 65B via the bearing 70B. The pressing flange member 67B may apply a pressing force against the flange member 55, so that the circular cutter B can be clamped between the flange members 53 and 55.

The bearing 70B may be a thrust bearing and may be arranged between the operation knob 65B and the pressing flange member 67B. This bearing 70B may include a rotation side abutment member 71B fixedly attached to the operation knob 65B by a suitable fastening device, such as screws 77B, a pressing side abutment member 73B for contacting with the pressing flange member 67B, and a plurality of rolling pins 75B provided between the rotation side abutment member 71B and the pressing side abutment member 73B. Through the rolling movement of the rolling pins 75B, the bearing 70B may serve to reduce a friction force between the rotation side abutment member 71B and the pressing side abutment member 73B. Further, a Belleville spring 78B may be interposed between the bearing 70B and the engaging head portion 633B of the fastening bolt 63B. This Belleville spring 78B may have a shape of a truncated conical disk and may urge the fastening bolt 63 in a direction away from the bearing 70B. When the fastening bolt 63B is spaced away from the bearing 70B due to the urging force of the Belleville sprig 78B, the operation device 61B may be brought to an axial load increased state shown in FIGS. 9 and 10. On the other hand, when the fastening bolt 63B is held close to the bearing 70B against the urging force of the Belleville spring 78B, the operation device 61B may be brought to an axial load reduced state shown in FIGS. 7 and 8. The axial load increased state and the axial load reduced state will be described later.

Figure 7:
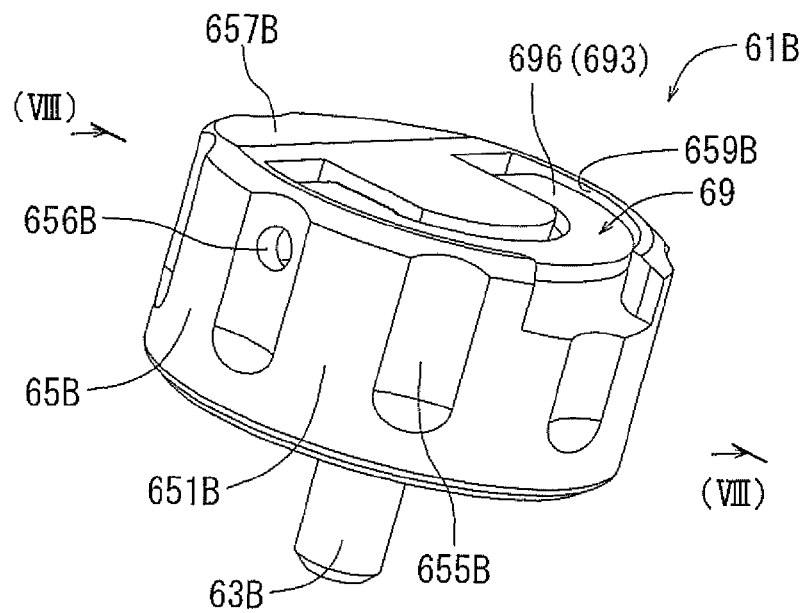
FIG. 7 is an enlarged perspective view of an operation device for operating a fixing device of a cutting tool according to a third embodiment and illustrating an axial load reduced state.
Figure 8:
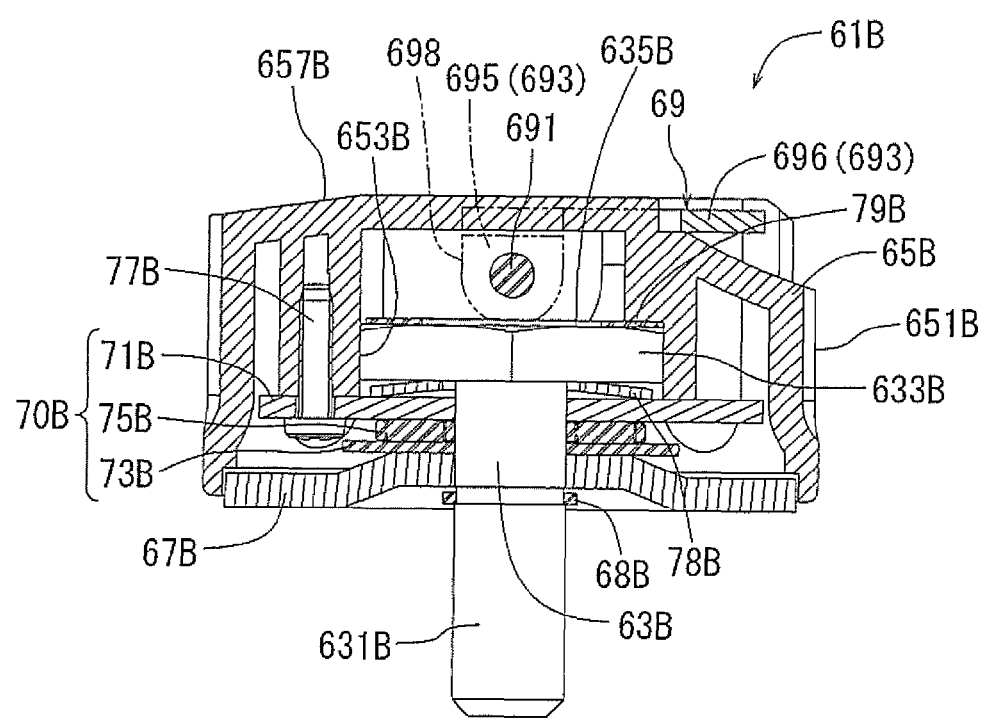
FIG. 8 is a sectional view taken along line (VIII)-(VIII) in FIG. 7.

The pull-out type operation portion 69 may include a substantially rod-like rotation shaft 691, and an operation main body 693 pivotally supported by the rotation shaft 691. The rotation shaft 691 may extend in a diametrical direction with respect to the rotational axis of the operation knob 65B. Opposite ends of the rotation shaft 691 may be inserted into a pair of support holes 656B formed in the operation knob 65B so as to be supported by the operation knob 65B. The operation main body 693 may be formed as a substantially semi-annular shape. The rotation shaft 69 may rotatably support a pair of support legs 695 formed on opposite ends in the circumferential direction of the operation main body 693. The substantially semi-annular portion other than the pair of support legs 695 of the pull-out type operation portion 69 may be configured as an operation portion 696. In this way, the rotation shaft 691 is passed through the pair of support legs 695 to rotatably support the pull-out type operation portion 69. On the other hand, an accommodation recess 659B may be formed in an outer axial end surface 657B of the operation knob 65B for allowing accommodation of the operation portion 696. The accommodation recess 659B may be appropriately formed to provide a space that may substantially conform to the shape of the operation portion 696. In this way, as shown in FIGS. 7 and 8, the accommodation recess 659B can accommodate the operation portion 696. Further, as shown in FIGS. 9 and 10, by pivoting the operation portion 696, the operation portion 696 may be pulled up from the accommodation recess 659B.

Each of the pair of support legs 695 may have a first contact peripheral surfaces 697 and a second contact peripheral surface 698 that have different distances with respect to a radial distance from the axis of the rotation shaft 691. As shown in FIG. 10, the first contact peripheral surface 697 may have a first radial distance from the axis of the rotation shaft 691, which may be shorter than a second radial distance of the second contact peripheral surface 698 from the axis of the rotation shaft 691. As shown in FIG. 8, the first contact peripheral surface 697 may oppose to an axial end surface 635B of the engagement head portion 633B of the fastening bolt 63B when the pull-out type operation portion 69 is accommodated. On the other hand, as shown in FIG. 10, the second contact peripheral surface 698 may oppose to the axial end surface 635B when the pull-out type operation portion 69 is raised or pulled out.

Figure 9:
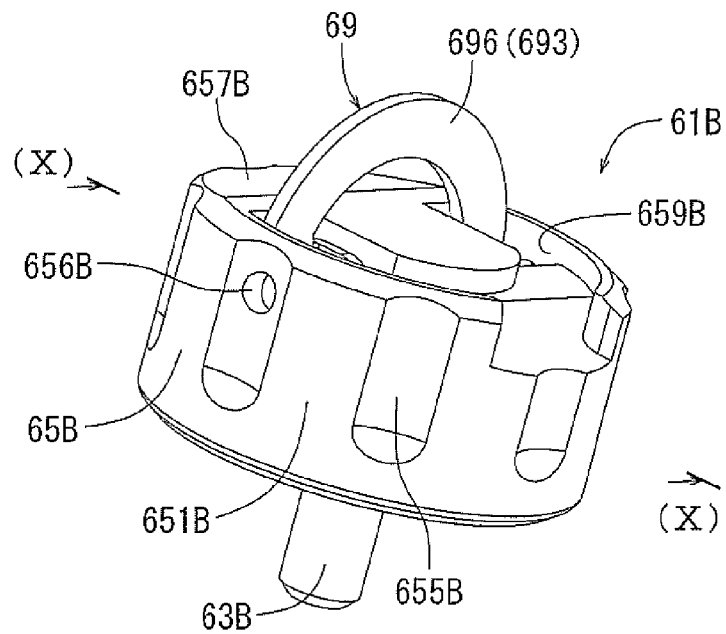
FIG. 9 is a perspective view of the fixing device similar to FIG. 7 but illustrating an axial load increased state.
Figure 10:
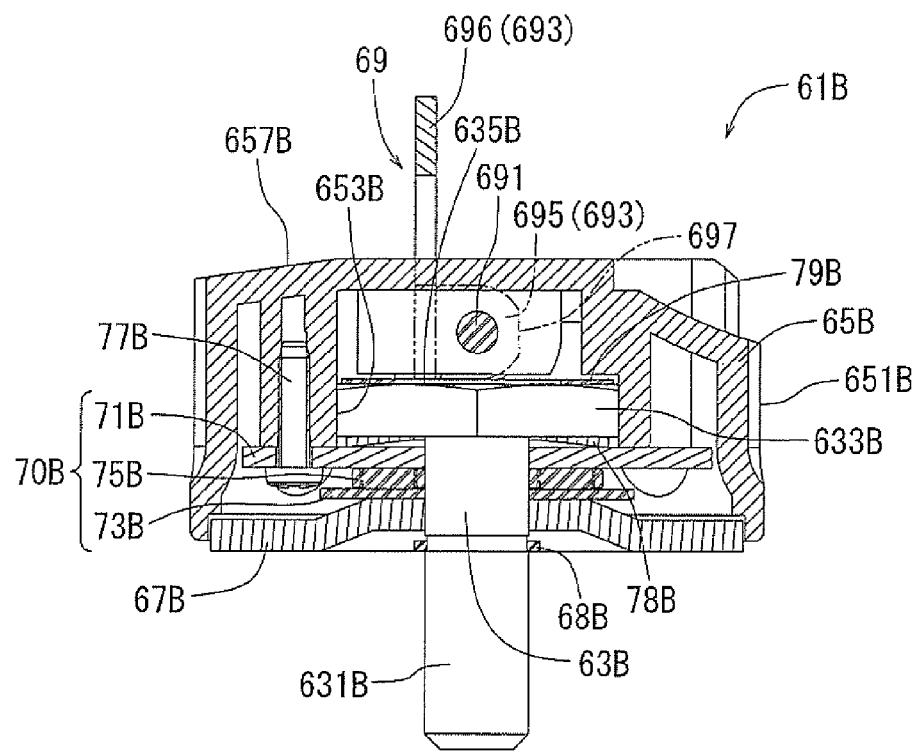
FIG. 10 is a sectional view taken along line (X)-(X) in FIG. 9.

When the pull-out type operation portion 69 is raised as shown in FIGS. 9 and 10, the second contact peripheral surface 698 may contact the axial end surface 635B so as to press the same against the urging force of the Belleville spring 78B due to the longer radial distance from the axis of the rotation shaft 691. Then, the Belleville spring 78B may be compressed, and the the rotation side abutment member 71B may be shifted axially toward the engagement head portion 633B of the male thread portion 631B. In other words, the operation knob 65B may shift axially in the loosening direction. With the pull-out type operation portion 69 positioned in the raised position, the operation knob 65B may be rotated to tighten the fastening bolt 63B. After that, the pull-out type operation portion 69 may be returned to the accommodation position shown in FIGS. 7 and 8 where the first contact peripheral surface 697 may be brought to contact the axial end surface 635B of the engagement head portion 631B. Because the radial distance of the first contact peripheral surface 697 from the axis of the rotation shaft 691 is shorter than that of the second contact peripheral surface 698, the compression of the Belleville spring 78B may be released to return the rotation side abutment member 71B so as to be shifted axially away from the engagement head portion 633B of the male thread portion 631B. In other words, the operation knob 65B may shift axially in the tightening direction. In this way, the axial load applied to the bearing 70B, more specifically, the axial load applied to the plurality of rolling pins 75B and the pressing side abutment member 73B may be increased. Therefore, it is possible to further firmly clamp the circular cutter B by the clamp device 51 (not shown). In addition, it may be possible to inhibit accidental rotation of the operation knob 65B.

With the operation device 61B of the third embodiment, it is possible to provide substantially the same effects as those of the operation device 61 of the first embodiment described above. In addition, the operation device 61B of the third embodiment may allow two different states, i.e., the axial load reduced state and the axial load increased state, with respect to the axial load applied to the bearing 70B according to the operation of the pull-out type operation portion 69. More specifically, the axial load reduced state may be achieved when the pull-out type operation portion 69 is in the raised position shown in FIGS. 9 and 10, and the axial load increased state may be achieved when the pull-out type operation portion 69 is in the accommodation position shown in FIGS. 7 and 8.

[Fourth Embodiment]

Figure 11:
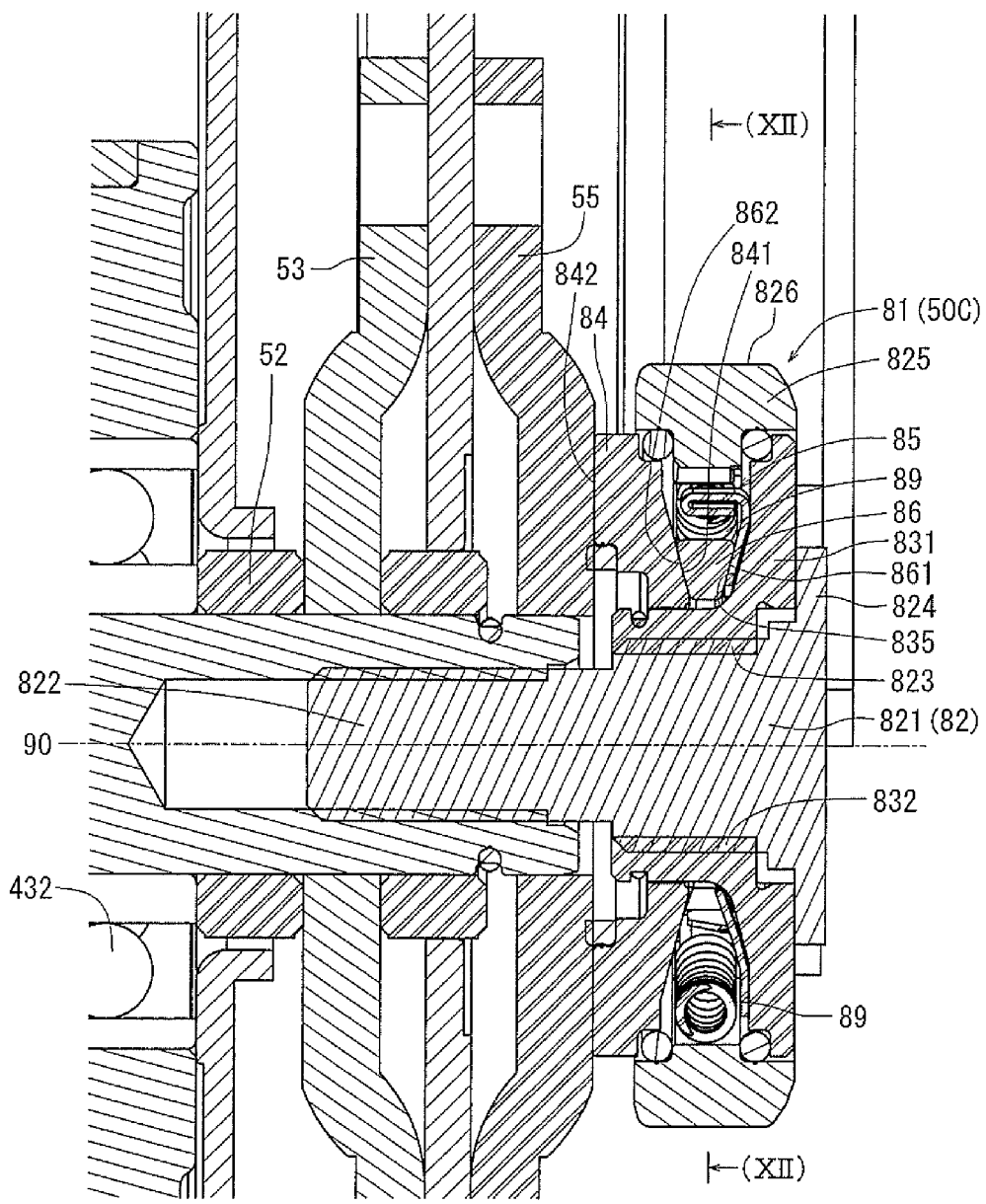
FIG. 11 is an enlarged sectional view showing a fixing device and an operation device for operating the fixing device of a cutting device according to a fourth embodiment.
Figure 12:
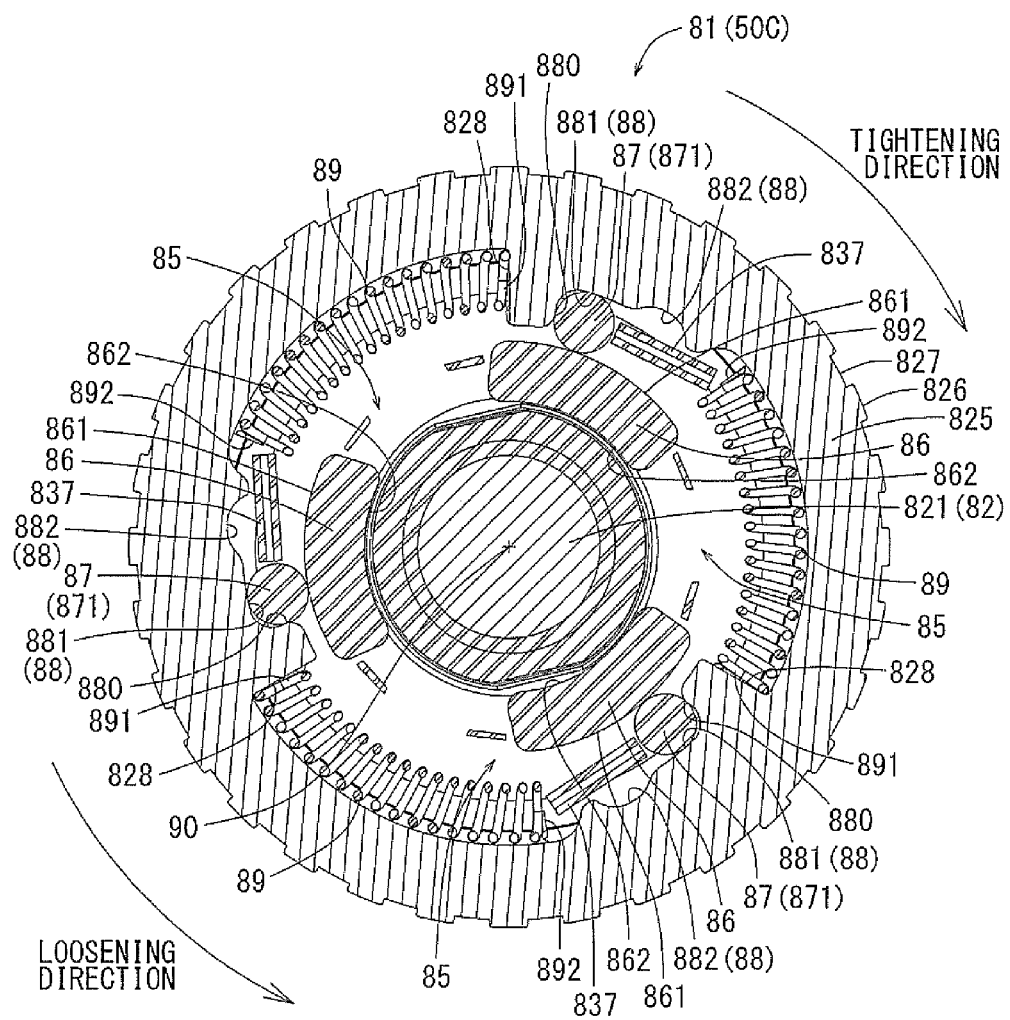
FIG. 12 is a sectional view of the operation device taken along line (XII)-(XII) in FIG. 11.
Figure 13:
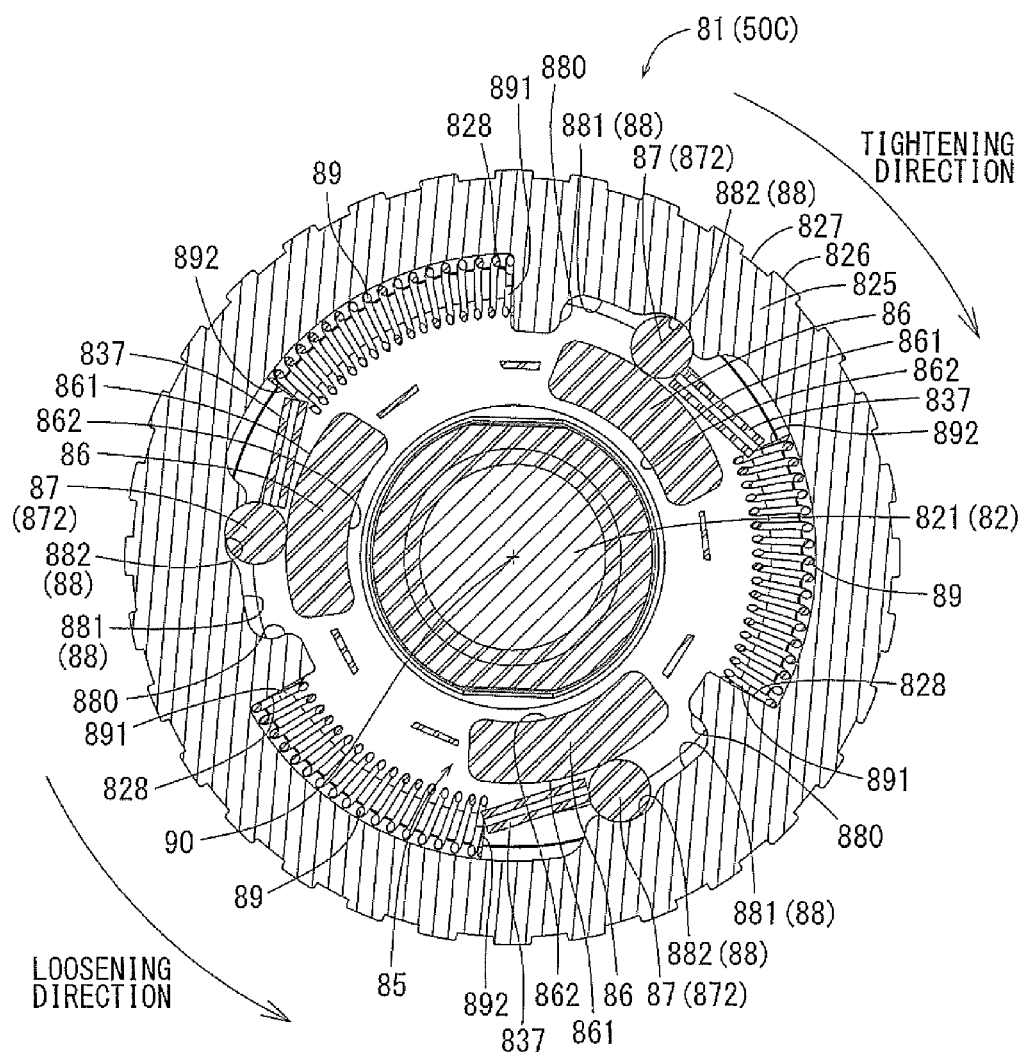
FIG. 13 is a sectional view similar to FIG. 12 but showing a lock release position of the operation device.

Next, a fourth embodiment will now be described with reference to FIGS. 11 through 13 showing a cutter mounting device 50C of a cutting device according to the fourth embodiment. The cutting device of the fourth embodiment is different from the cutting device 10 of the first embodiment only in a cutter mounting device 50C. More specifically, the cutter mounting device 50C may be different from the cutter mounting device 50 of the first embodiment only in the construction of an operation device 81 shown in FIGS. 12 and 13. Therefore, in FIGS. 11 through 13, like members are given the same reference numerals as the first embodiment and a description of these member will not be repeated.

The operation device 81 of the fourth embodiment is configured to inhibit loosening of a fixation force by using a wedge mechanism while the operation device 81 is forcing a pressing flange member 84 to be pressed against the flange member 55. As shown in FIG. 11, the operation device 81 may generally include a fastening bolt member 82, the pressing flange member 84, and a plurality of wedge mechanisms 85. The fastening bolt member 82 may include a bolt main body 821, an annular operation portion 825, and a wedge engaging portion 831. The bolt main body 821 may include a male thread portion 822, a male joint portion 823 and a flange portion 824. The male thread portion 822 may threadedly engage the female thread hole 49. The wedge engaging portion 823 may be joined to the male thread portion 822 via the male joint portion 831, so that the wedge engaging portion 831 can rotate together with the male thread portion 822. The flange portion 824 may axially abut the wedge engaging portion 831.

The annular operation portion 825 may rotate together with the bolt main body 821 and the wedge engaging portion 831 by the action of the plurality of wedge mechanisms 85 as will be described later. The annular operation portion 825 may have an outer peripheral surface 826 that can be grasped by the operator for manual operation. The outer peripheral surface 826 may be provided with a plurality of grooves 827 for facilitating the rotational operation by the operator. The wedge engaging portion 831 may include a female joint portion 832 to be joined to the male engaging portion 823 of the bolt main body 821, so that the bolt main body 821 and the wedge engaging portion 831 can rotate together. For example, the male engaging portion 823 and the female engaging portion 832 may respectively include spline projections and spline grooves to constitute a spline mechanism.

On the other hand, except for a lock releasing operation described later, the annular operation portion 825 can rotate together with the bolt main body 821 and the wedge engaging portion 831. The surface of the wedge engaging portion 831 facing the pressing flange member 84 may be configured as a wedge engaging surface 835. The wedge engaging surface 835 may be inclined toward the pressing flange member 84 along a radial direction toward a rotation axis 90 of the bolt main body 821. The pressing flange member 84 may act substantially in the same manner as the pressing flange member 67 of the first embodiment. More specifically, the pressing flange member 84 may be supported by the wedge engaging portion 831 such that it can move relative to the wedge engaging portion 831 in the axial direction and can rotate relative thereto. The surface of the pressing flange member 84 axially facing the wedge engaging portion 831 may be configure as a wedge engaging surface 841. The wedge engaging surface 841 may be also inclined toward the wedge engaging portion 831 along a radial direction toward the rotation axis 90. The pressing flange member 84 may include a pressing surface 842 on the side of the flange member 55. When the wedge engaging surface 841 of the pressing flange member 84 receives a pressing force, the pressing surface 842 may be pressed against the flange member 55.

Next, the plurality of wedge mechanisms 85 will be described. As shown in FIGS. 12 and 13, the plurality of wedge mechanisms 85 may be respectively arranged at three regions divided uniformly around the rotation axis 90. Each of the wedge mechanisms 85 may include a wedge member 86, a rolling ball 87, a ball guide portion 88, and an urging spring 89. As shown in FIG. 11, the wedge member 86 may be formed to have a substantially triangular cross sectional configuration in a radial direction of the rotational axis 90. The wedge member 86 may have a given length in the circumferential direction about the rotational axis 90. With this configuration, the wedge member 86 may wedge between the wedge engaging portion 831 and the pressing flange member 84. More specifically, an axially outer surface 861 of the wedge member 86 may be inclined so as to be capable of contacting the wedge engaging surface 835 of the wedge engaging portion 831 in face-to-face contact relationship therewith. Similarly, an axially inner surface 862 of the wedge member 86 may be inclined so as to be capable of contacting the wedge engaging surface 841 of the pressing flange member 84 in face-to-face contact relationship therewith. Thus, the thickness of the wedge member 86 may be reduced in the radial direction toward the rotation axis 90, and, conversely, the thickness of the wedge member 86 may be increased in the radial direction away from the rotation axis 90. Therefore, when the wedge member 86 is forced to wedge between the wedge engaging portion 831 and the pressing flange member 84, the axially outer surface 861 may contact the wedge engaging surface 835, and the axially inner surface 862 may contact the wedge engaging surface 841. As a result, the wedge engaging portion 831 and the pressing flange member 84 may be forced to move away from each other in the axial direction. The wedge engaging portion 831 may be prevented from moving in the loosening direction (rightward as viewed in FIG. 11) by the flange portion 824 of the bolt main body 821. Therefore, the pressing flange member 84 may be force to move in the fastening direction (leftward as viewed in FIG. 11). Although not shown in the drawings, the wedge members 86 may be supported by a support mechanism provided on the wedge engaging portion 831 so that the wedge members 86 can move relative to the wedge engaging portion 831 in the radial direction while they move together with the wedge engaging portion 831 in the rotational direction.

The rolling ball 87 of each of the plurality of wedge mechanisms 85 may be arranged between the annular operation portion 825 and the corresponding wedge member 86. A plurality of ball guide portions 88 may be formed in the inner circumferential surface of the annular operation portion 825, and each of the ball guide portions 88 may constitute one of components of the wedge mechanism 85 as described above. The ball guide portion 88 of each of the wedge mechanisms 85 may serve to guide the rolling ball 87 such that the rolling ball 87 can roll along the ball guide portion 88. As the rolling ball 87 rolls along the ball guide portion 88, the rolling ball 87 may move between two different positions, i.e., a lock position (indicated by numeral 871 in FIG. 12) and a lock releasing position (indicated by numeral 872 in FIG. 13). When the rolling ball 87 is positioned at the lock position 871 as shown in FIG. 12, the wedge member 86 may be positioned at a lock position (indicated by numeral 861) that is a nearer to the rotation axis 90. On the other hand, when the rolling ball 87 is positioned at the lock releasing position 872 as shown in FIG. 13, the wedge member 86 may be positioned at a lock releasing position (indicated by numeral 862) that is further from the rotation axis 90.

The ball guide portion 88 may include a ball engaging portion 880, a flat portion 881 and a relief recess portion 882 arranged in series in the circumferential direction. The flat portion 881 may extend in the circumferential direction. The ball engaging portion 880 and the relief recess portion 882 may be located at opposite ends in the circumferential direction of the flat portion 881. The ball engaging portion 880 may extend radially inward from the flat portion 881 for engagement with the rolling ball 87 at the circumferential end of the flat portion 881. As long as the rolling ball 87 is in contact with the flat portion 881, the rolling ball 87 may be positioned at the lock position (indicated by numeral 871 in FIG. 12) nearer to the rotational axis 90. On the other hand, when the rolling ball 87 is received by the relief recess portion 882 that is recessed radially outward relative to the flat portion 881, the rolling ball 87 may be positioned at the lock releasing position (indicated by numeral 872 in FIG. 13) further from the rotational axis 90. Although not shown in the drawings, a ball support mechanism may be provided on the wedge engaging portion 831 for supporting the rolling balls 87 such that the rolling balls 87 can move in the radial direction but are prevented from moving in the circumferential direction. Therefore, the rolling balls 87 move in the circumferential direction together with the wedge engaging portion 831. In another embodiment, a separate stopper device may be provided between the annular operation portion 825 and the wedge engaging member 831 for preventing rotation of the annular operation portion 825 in the fastening direction relative to the wedge engaging portion 831 from the position shown in FIG. 12.

The urging spring 89 may be a coil spring and may extend in the circumferential direction. The urging spring 89 may have a fastening side end 891 and a loosening side end 892. The fastening side end 891 may contact a support step portion 828 formed on the inner circumferential surface of the annular operation portion 825. The loosening side end 892 may contact a contact guide portion 837 formed on the wedge engaging portion 831. In this embodiment, a plurality of support step portions 828 and a plurality of contact guide portions 837 may be provided in correspondence with the plurality of wedge mechanisms 85. The urging springs 89 may urge the annular operation portion 825 in the fastening direction, so that the annular operation portion 825 may be held in the position shown in FIG. 12 when no turning force is applied to the annular operation portion 825 and when a turning force is applied to the annular operation portion 825 in the fastening direction as will be explained later. On the other hand, when the turning force is applied to the annular operation portion 825, the annular operation portion 825 may rotate relative to the wedge engaging portion 831 by a given angle to allow movement of the rolling ball 87 from the lock position 871 to the lock releasing position 872.

As noted above, when the annular operation portion 825 of the operation device 81 is turned in the fastening direction, each of the rolling balls 87 may be positioned at the lock position (indicated by numeral 871 of FIG. 12). When the rolling ball 87 is positioned at the lock position, the wedge member 86 may be positioned at the lock position (indicated by numeral 861). In the lock position, the wedge member 86 wedges between the wedge engaging portion 831 and the pressing flange member 84. Therefore, the axially outer surface 861 of the wedge member 86 may be brought into face-to-face contact with the wedge engaging surface 835 so as to apply a pressing force against it. At the same time, the axially inner surface 862 of the wedge member 86 may be brought into face-to-face contact with the pressure receiving engaging surface 841 so as to apply a pressing force against it. In this way, the wedge member 86 acts so as to move the wedge engaging portion 831 and the pressing flange member 84 from each other in the axial direction. Therefore, the wedge member 86 may force the pressing flange member 84 to be pressed against the flange members 55.

On the other hand, when the annular operation portion 825 of the operation device 81 is turned in the loosening direction after the annular operation portion 825 has been rotated to firmly clamp the circular cutter B between the flange members 53 and 55, the urging springs 89 may be compressed to allow movement of the rolling balls 87 into the relief recess portions 882 along the flat portions 881, so that each of the wedge members 86 may be moved to the lock releasing position (indicated by numeral 862). Therefore, each of the wedge members 86 having wedged between the wedge engaging portion 831 and the pressing flange member 84 may be released from wedging. Therefore, the wedge engaging portion 831 and the pressing flange member 84 can move toward to each other. In this way, the pressing force applied to the flange member 55 by the pressing flange member 84 can be diminished or minimized, making it possible to release the clamping force applied to the circular cutter B by the flange members 53 and 55.

When the turning force applied to the annular operation portion 825 of the operation device 81 in the loosening direction is released, the annular operation portion 825 may rotate in the fastening direction, so that the rolling balls 87 may return to the lock position (indicated by numeral 871 in FIG. 12). Therefore, the wedge members 86 may move to the lock position (indicated by numeral 861) nearer to the rotation axis 90. Hence, the wedge members 86 move the wedge engaging portion 831 and the pressing flange member 84 away from each other, so that the pressing flange member 84 may again apply a pressing force against the flange member 55.

Further, the wedge mechanisms 85 each including the rolling ball 87 may serve to reduce the frictional force produced between the annular operation portion 825 and the pressing flange member 84. Further, the inertial action force generated through the rotation of the circular cutter B may act to increase a fastening force applied by the operation device 81.

[Fifth Embodiment]

Figure 14:
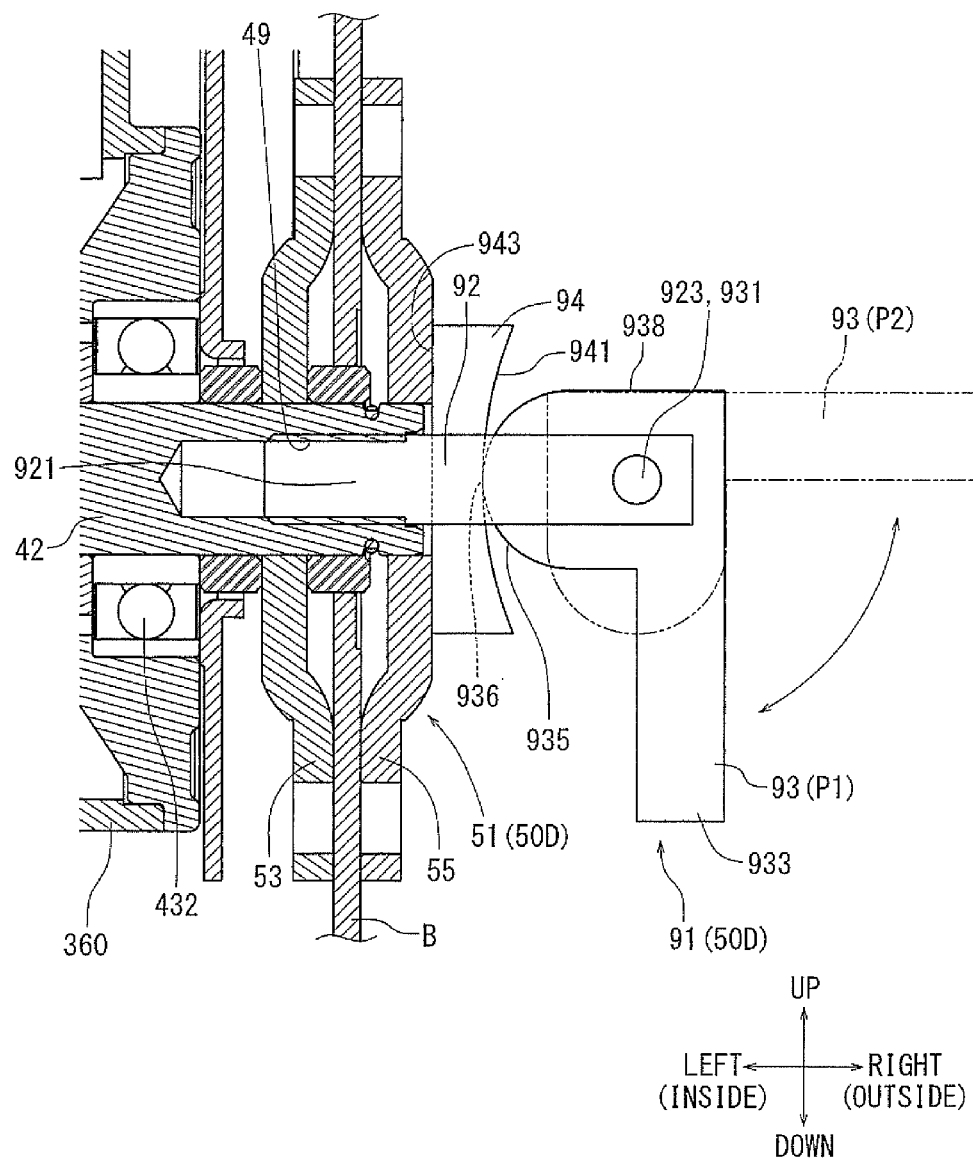
FIG. 14 is an enlarged sectional view of a fixing device and an operation device for operating the fixing device of a cutting device according to a fifth embodiment.

A fifth embodiment will now be described with reference to FIG. 14. FIG. 14 is an enlarged sectional view of a cutter mounting device 50D of a cutting device according to the fifth embodiment. The cutting device of the fifth embodiment is different from the cutting device 10 of the first embodiment only in an operation device 91 of the cutter mounting device 50D. More specifically, the operation device 91 is different from the operation device 61 of the cutter mounting device 50 of the first embodiment. Therefore, in FIG. 14, like members are given the same reference numerals as the first embodiment and the description of these members will not be repeated.

This cutter mounting device 50D may include the clamp device 51 (53, 55) and the operation device 91. The clamp device 51 may be constructed in the same way as that of the first embodiment. The operation device 91 may be configured to use a cam action between a cam operation member 93 and a pressing flange member 94 for pressing the pressing flange member 94 against the flange member 55 in the axial direction to clamp the circular cutter B by the clamp device 51. The operation device 91 may generally include a fastening bolt 92, the cam operation member 93, and the pressing flange member 94.

The fastening bolt 92 may include a male thread portion 921 threadedly engaged with the female thread hole 49, and a rotation shaft support portion 923. The rotation shaft support portion 923 may be disposed at a protruding end portion of the fastening bolt 92 protruding outwards (to the right). The rotation shaft support portion 923 may rotatably support a pivotal shaft 931 of the cam operation member 93. The pressing flange member 94 may include a pressure receiving curved surface 941 on its axially outer side (right-hand side) and include a pressing flat surface 943 on its axially inner side (left-hand side). The pressure receiving curved surface 941 may slidably contact a pair of cam portions 935 (only one cam portion 935 is shown in FIG. 14) of the cam operation member 93 to cause a cam action therewith. More specifically, each of the pair of the cam portions 935 may a convex curved surface as will be described later. The cam action may cause the pressing flat surface 943 to be pressed against the flange member 55 in the axial direction.

The cam operation member 93 may have a substantially L-shaped configuration. The pivotal support shaft 931 may be located at a bent portion of the L-shape of the cam operation member 93. Further, the cam operation member 93 may have an operation lever portion 933 on one side of the L-shape with respect to the pivotal support shaft 931. The pair of cam portions 935 may be formed on the other side of the L-shape with respect to the pivotal support shaft portion 931 and may be formed to extend in a bifurcated manner from the operation lever portion 933, so that the pair of cam portions 935 are located on opposite sides with respect to the male thread portion 921. The operation lever portions 933 may have an appropriate length for facilitating the pivotal operation of the cam operation member 93. Each of the cam portions 935 may include a pressing curved surface 936 and a pressing releasing flat surface 938. The pressing curved surface 936 may be formed to have a convex curved surface to protrude from the pivotal support shaft 931 in a direction orthogonal to the direction in which the operation lever portion 933 extends.

On the other hand, the pressing releasing flat surface 938 may be located on the side opposite to the operation lever portion 933 with respect to the pivotal support shaft 931. That is, the pressing releasing flat surface 938 may be arranged on the side orthogonal to the side of the pressing curved surface 936. The pressing curved surface 936 may extend substantially along a circular arc. A distance between the pressing curved surface 936 and the axis of the pivotal support shaft 931 may be determined to be larger than a distance between the pressing releasing flat surface 938 and the pivotal support shaft 931. The operation lever portion 933 may be operated to position the pressing curved surface 936 or the pressing releasing flat surface 938 of each of the cam portions 935 so as to be opposed to the pressing flange member 94. The pressure receiving curved surface 941 may be configured as a curved surface having a radius of curvature larger than that of the pressing curved surface 936.

More specifically, when the cam operation member 93 is positioned at a position P1 indicated by solid lines in FIG. 14, the pressing curved surface 936 of each of the cam portions 935 may oppose to the pressing flange member 94. On the other hand, when the cam operation member 93 is positioned at a position P2 indicated by chain lines in FIG. 14, the pressing releasing flat surface 938 of each of the cam portions 935 may oppose to the pressing flange member 94. When the cam operation member 93 is positioned at the position P1, the cam pressing curved surface 936 of each of the cam portions 935 may contact the pressing flange member 94 to press the pressing flange member 94 against the flange member 55. When the operation lever 933 is pivoted to position the cam operation member 93 at the position P2 where the pressing releasing flat surface 938 of each of the cam portions 935 opposes the pressing flange member 94, the pressing releasing flat surface 938 may not contact the pressing flange member 94 but may be spaced therefrom. Therefore, it is possible to release the pressing force applied to the pressing flange member 94. When, the cam operation member 93 is positioned at the position P2, the operator can easily rotate the cam operation member 93 in the same direction as the loosening direction of the male thread portion 921, so that the male thread portion 921 may rotate in the loosening direction together with the cam operation member 93. In this way, it is possible to move the position of the pivotal support shaft 931 further away from the pressing flange member 94. In this state, it may be possible, for example, to disassemble the flange members 53 and 55 for replacement of the circular cutter B.

For example, in order to apply a pressing force by the cam operation member 93, the operator may position the cam operation member 93 at the position P2 and may then rotate the cam operation member 93 in the fastening direction of the male thread portion 921, so that the position of the pivotal support shaft 931 may move toward the pressing flange member 94. Thereafter, the operator may pivot the operation lever portion 933 to move the cam operation member 93 to the position P1. Hence, the pressing curved surface 936 of each of the cam portions 935 may apply a pressing force against the pressing flange member 94. In this way, the pressing force may be applied to the flange member 55 by the cam operation member 93, enabling the cutter mounting device 50D to fix and retain the circular cutter B. Alternatively, the operator may position the cam operation member 93 at the position P1 and may rotate the cam operation member 93 in the fastening direction of the male thread portion 921 until the pressing curved surface 936 of each of the cam portions 935 contacts the pressing flange member 94. Thereafter, the operator may pivot the cam operation member 93 to the position P2 and may rotate the cam operation member further in the fastening direction by a small distance. Subsequently, the operator may pivot the cam operation member 93 to the position P1, so that the pressing curved surface 936 of each of the cam portions 935 may apply a pressing force against the pressing flange member 94.

As described above, with the cutter mounting device 50D of this embodiment, it is possible to releases the fixation the circular cutter B by the manual operation of the cam operation member 93 without need of a separate operating tool.

[Sixth Embodiment]

Figure 15:
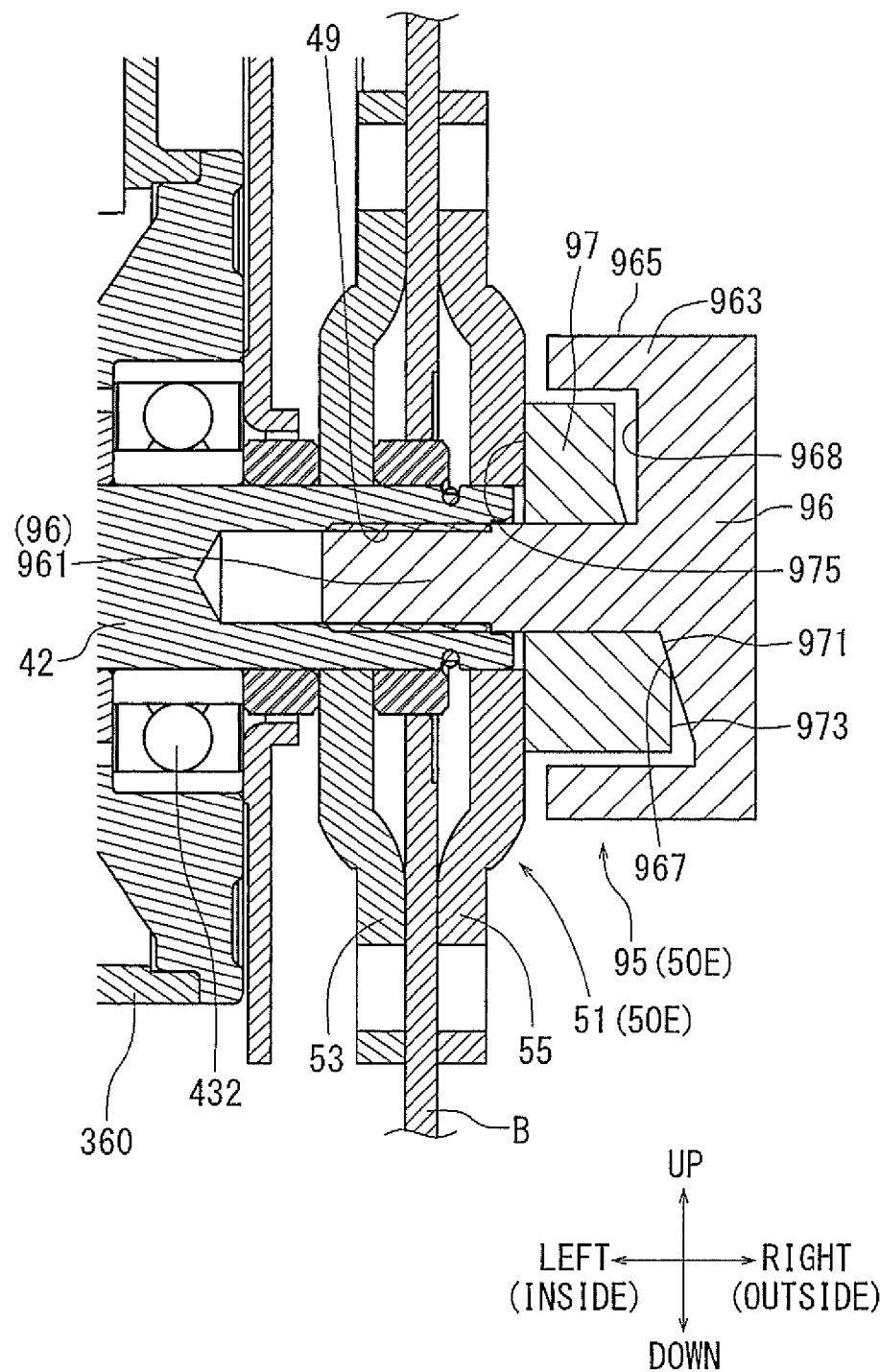
FIG. 15 is an enlarged sectional view of a fixing device and an operation device for operating the fixing device of a cutting device according to a sixth embodiment.

A sixth embodiment will now be described with reference to FIG. 15. The sixth embodiment is a modification of the fifth embodiment and is different from the fifth embodiment in that an operation device 95 of a cutter mounting device 50E is different from the operation device 91 of the cutter mounting device 50D of the fifth embodiment. Therefore, in FIG. 15, like members are given the same reference numerals as the fifth embodiment and the description of these members will no be repeated.

The operation device 95 of the cutter mounting device 50E may include a dial cam member 96 and a pressing member 97. A cam action between the dial cam member 96 and the pressing member 97 may be utilized to press the pressing member 97 in the axial direction against the flange member 55.

The dial cam member 96 may include a bolt portion 961 and an operation dial portion 963 that are formed integrally with each other. The bolt portion 961 may be threadedly engaged with the female thread hole 49. The operation dial portion 963 may include a dial portion 965 formed on the outer peripheral side. The operation dial portion 963 may include a cam portion 967 and a lock portion 968 formed on the radially inner side of the dial portion 965. The dial portion 965 may have a ring-like shape for manual turning operation by the operator. Rotating the dial portion 965 may fasten and loosen the bolt portion 961. The cam portion 967 may be inclined relative to the diametrical direction of the dial portion 965 and may be also inclined such that a distance from the axially outer end surface (right end surface as viewed in FIG. 159 of the dial cam member 96 gradually increases in the rotational direction of the dial cam member 96. The lock portion 968 may have a flat shape formed in series with the cam portion 967 in the rotational direction and may serve as a lock surface.

On the other hand, the pressing member 97 may include a pressure receiving inclined surface 971 and a pressure receiving flat surface 973 which may axially face the dial cam member 96. The pressure receiving inclined surface 971 may be inclined so as to receive a pressure from the cam portion 967. The pressure receiving flat surface 973 may be pressed by the lock portion 968 when the dial cam member 96 has turned to a position where the cam portion 967 no longer opposes to the pressure receiving inclined surface 971 after passing a position where a part of the cam portion 967 remotest from the axially outer end surface of the dial cam member 96 opposes to the pressure receiving inclined surface 971. In this way, the dial cam member 96 can press the flange member 55 of the clamp device 51 in the axial direction by the cam action, for example from the position shown in FIG. 15. Therefore, with the cutter mounting device 50E, the operator can manually operate the dial cam member 96 to apply a pressing force against the pressing member 97 or to release the pressing force, making it possible to mount and remove the circular cutter B without need of use of a separate tool.

[Seventh Embodiment]

Figure 16:
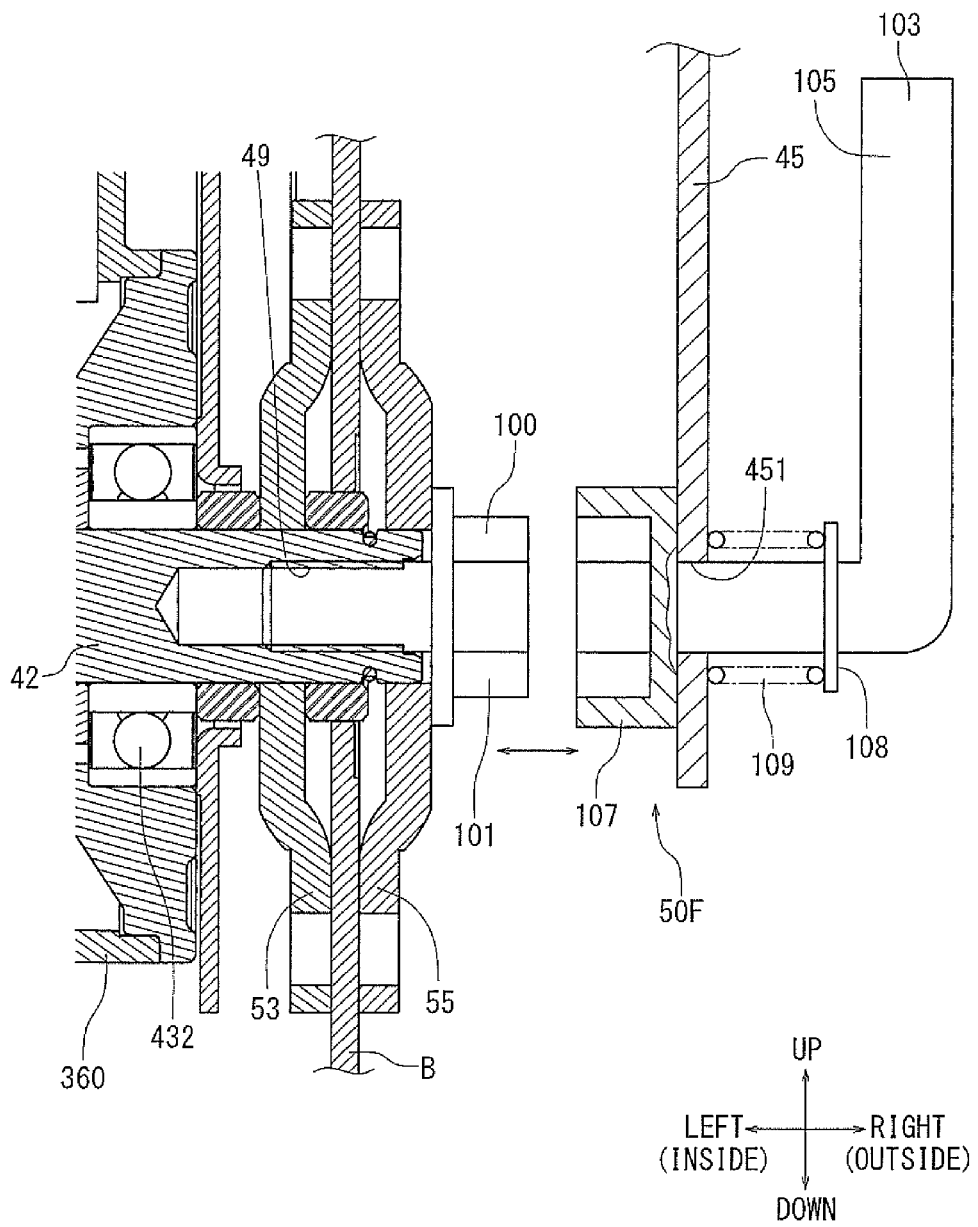
FIG. 16 is an enlarged sectional view of the fixing device according to a seventh embodiment.

Next, a seventh embodiment will now be described with reference to FIG. 16 showing an operation device 50F of a cutting device according to this embodiment. The cutting device of the seven embodiment may be different from the cutting device 10 of the first embodiment only in the construction of the operation device 50F. Therefore, in FIG. 16, like members are given the same reference numerals as the first embodiment and the description of these members will not be repeated. In the operation device 50F according to the seventh embodiment, a bolt 100 may be used for applying a pressing force against the flange member 55 in order to clamp the circular cutter B between the flange members 53 and 55. That is, the bolt 100 may include a male thread portion for threadably engaging the female thread hole 49 of the rotational shaft 42.

The operation device 50F may further include a wrench device 103 mounted to the blade case section 45 and may be used for fastening and loosening the bolt 100.

As shown in FIG. 16, a mounting hole 451 for mounting the wrench device 103 may be formed in the blade case section 45 (more specifically, the blade case body 46) at a position facing the rotational shaft 42. The central axis of the mounting hole 451 may coincide with the axis of the female thread hole 49. The wrench device 103 may be inserted into the mounting hole 451 so as to be rotatably supported by the blade case section 45. Therefore, the wrench device 103 can be operated so as to rotate relative to the mounting hole 451. The wrench device 103 may include an operation lever portion 105 used for manual rotation, and a socket portion 107 engageagble with a hexagonal head portion 101 of the bolt 100. In this way, by engaging the socket portion 107 with the hexagonal head portion 101 of the bolt 100 and turning the operation lever portion 105 about the central axis of the mounting hole 451, the bolt 100 may rotate together with the operation lever portion 105.

The wrench device 103 may further include an engagement releasing urging spring 109 located on the axially outer side of the blade case section 45 and normally urging the wrench device 103 in a direction toward the axially outer side of the blade case section 45. Due to the urging force of the engagement releasing urging spring 109, the wrench device 103 may be normally urged in a releasing direction for releasing the engagement between the socket portion 107 and the hexagonal head portion 101 of the bolt 100. More specifically, one end of the engagement releasing urging spring 109 may contact the outer side surface of the blade case section 45, and the other end of the engagement releasing urging spring 109 may contact a flange portion 108 provided on the wrench device 103. As a result, only in the case that the wrench device 103 is pushed in a direction toward inside of the blade case section 45, the socket portion 107 can engage the hexagonal head portion 101 of the bolt 100, making it possible to fasten or loosen the bolt 100. Conversely, in case that no pushing force is applied to the wrench device 103, no engagement between the socket portion 107 and the hexagonal head portion 101 of the bolt 100 occurs due to the urging force of the engagement releasing urging spring 109. In this way, it is possible to normally keep the wrench device 103 at a position where the wrench device 103 does not obstruct the rotation of the circular cutter B. On the other hand, in fastening the bolt 100, the wrench device 103 makes it possible for the operator to manually operate the wrench device 103. As a result, it is possible to attach and detach the circular cutter B without need of use of a separate tool.

[Eighth Embodiment]

An eighth embodiment will now be described with reference to FIGS. 17 through 20. A cutting device of the eighth embodiment may be different from the cutting device 10 of the first embodiment only in the construction of a cutting unit 20G and a cutter mounting device 50G. Therefore, in FIGS. 17 through 20, like members are given the same reference numerals as the first embodiment and the description of these members will not be repeated.

Figure 17:
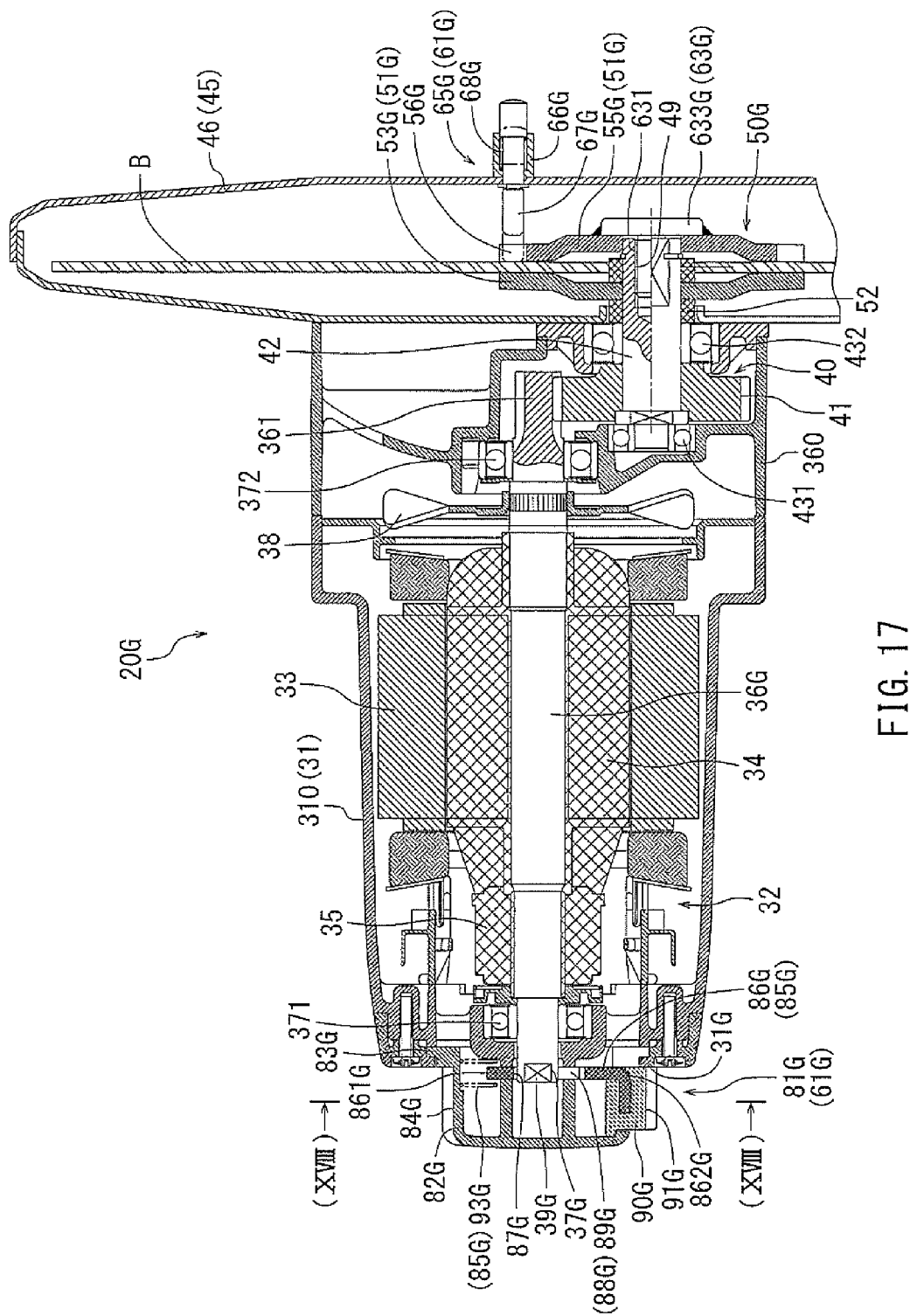
FIG. 17 is a sectional view of a fixing device and an operation device for operating the fixing device of a cutting device according to an eighth embodiment and showing the arrangement of these devices with respect to a cutting unit.
Figure 18:
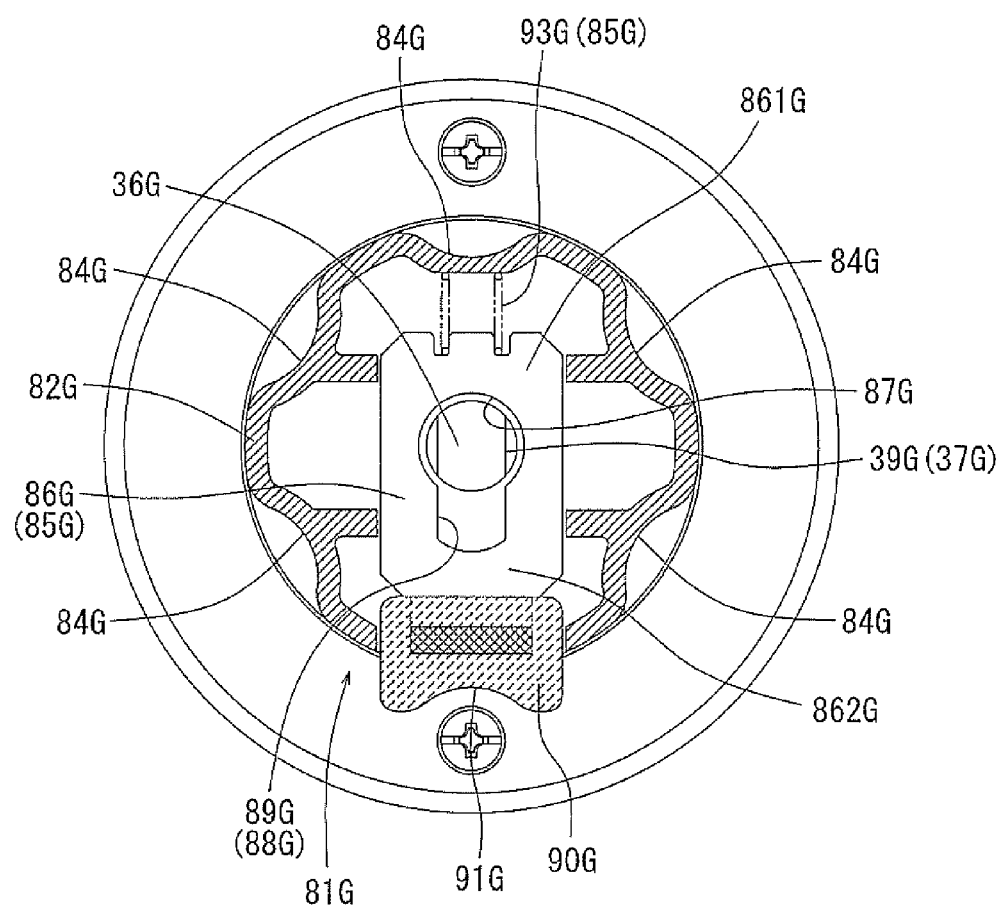
FIG. 18 is a sectional view taken along line (XVIII)-(XVIII) in FIG. 17.
Figure 19:
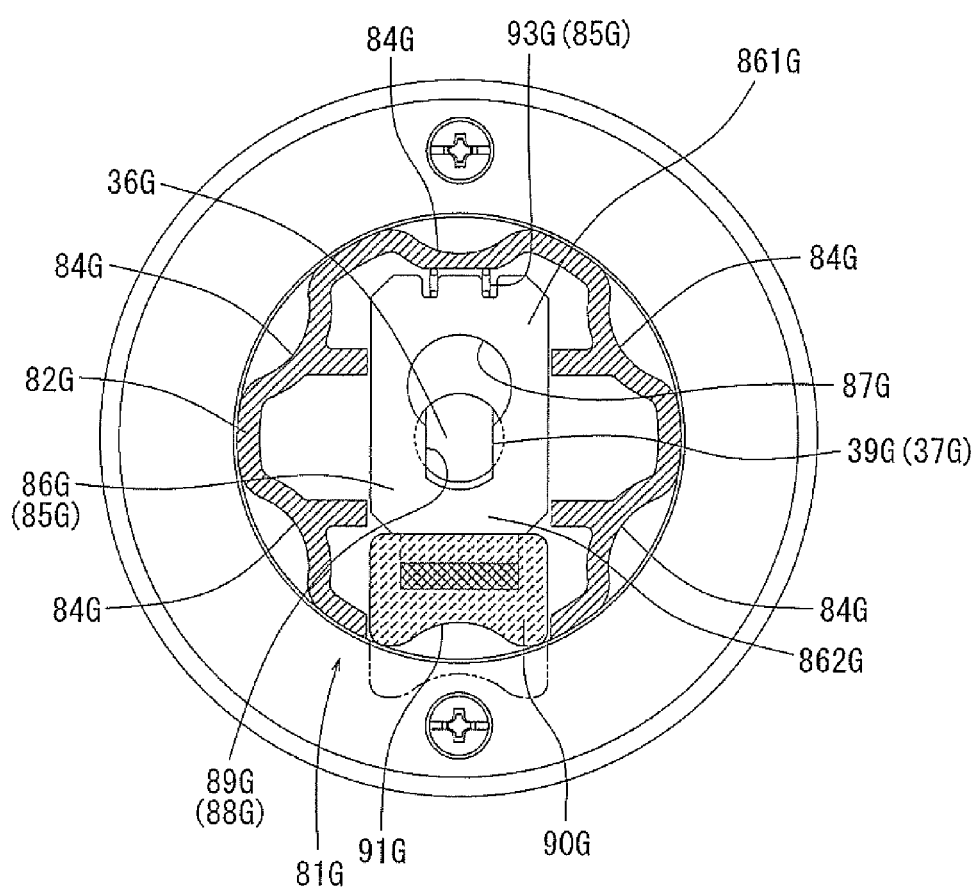
FIG. 19 is a sectional view similar to FIG. 18 but showing an engaging state of an operation knob mechanism.
Figure 20:
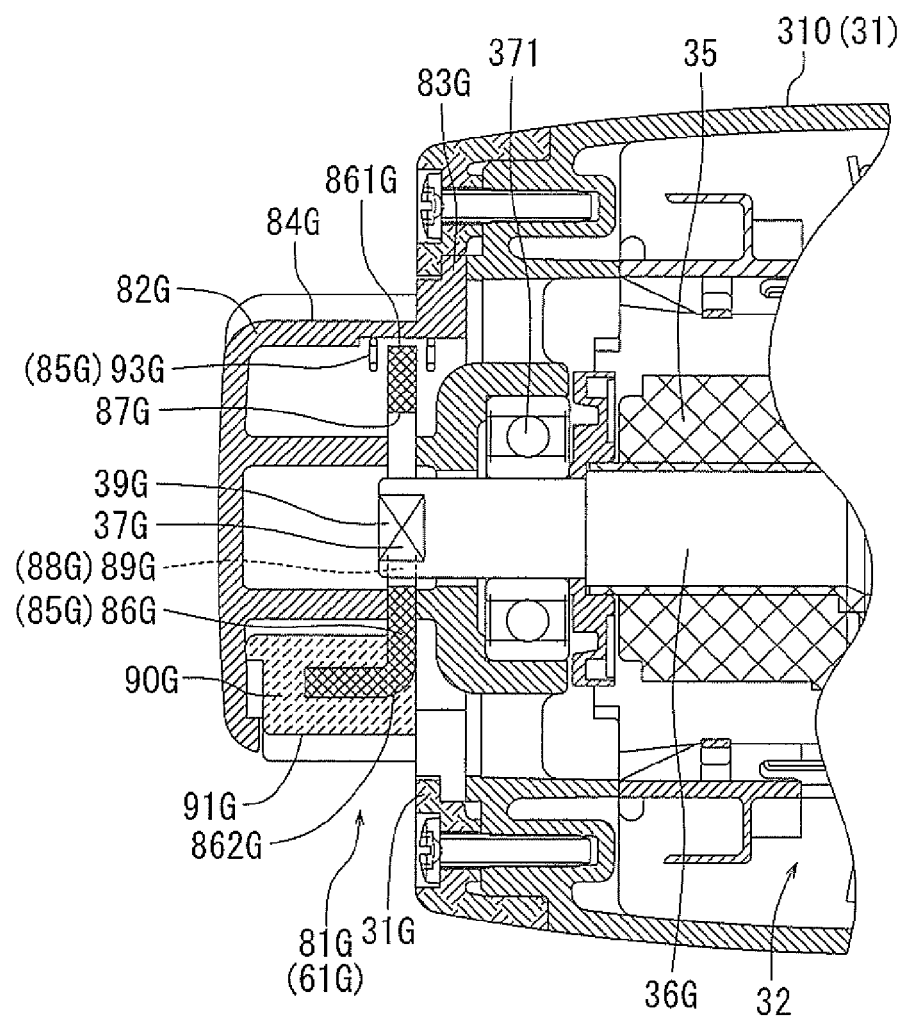
FIG. 20 is an enlarged view of a part of FIG. 17 but illustrating the operation knob mechanism in the engaging state.

The cutter mounting device 50G may include a clamp device 51G (53, 55G) and an operation device 61G. The clamp device 51G may be configured to be similar to the clamp device 51 of the first embodiment. As shown in FIG. 17, the operation device 61G may generally include a fastening bolt 63G, a flange engaging mechanism 65G, and an operation knob mechanism 81G. Similar to the fastening bolt 63 of the first embodiment, the fastening bolt 63G may has a male thread portion 631 and a head portion 633G formed integrally with the male thread portion 631. Here, the head portion 633G may be welded to an axially outer flange member 55G corresponding to the flange member 55 of the first embodiment so as to be integrated therewith. Therefore, the flange member 55G may rotate together with the fastening bolt 63G. The flange member 55G may include an engagement hole 56G for engagement with a rotation inhibiting shaft 67G of the flange engaging mechanism 65G.

The male thread portion 631 may be threadedly engaged with the female thread hole 49 provided in the rotational shaft 42. The male thread portion 631 may be fastened into the female thread hole 49 together with the outer flange member 55G when it is turned to the right. On the other hand, the male thread portion 631 may be loosened with respect to the female thread hole 49 together with the outer flange member 55G when it is turned to the left. The flange engaging mechanism 65G may generally include a support member 66G, the rotation inhibiting shaft 67G, and an urging spring 68G. The support member 66G may be mounted to the blade case section 45 (more specifically, blade case main body 46) and may serve to support the rotation inhibiting shaft 67G and the urging spring 68G. The rotation inhibiting shaft 67G may be supported by the support member 66G so as to be movable in the axial direction toward and away from the engagement hole 56G of the flange member 55B. The urging spring 68G may urge the rotation inhibiting shaft 67G in a disengaging direction (to the right-hand side in FIG. 17) for disengagement from the engagement hole 56G.

When the rotation inhibiting shaft 67G is moved in the axial direction against the urging force of the urging spring 68G so as to be engaged with the engagement hole 56G, the flange member 55G may be prevented from rotation relative to the rotation inhibiting shaft 67G. Therefore, the flange member 55G may be prevented from rotation relative to the blade case main body 46, and eventually relative to the motor housing 310. In this way, the fastening bolt 63G that may rotate together with the outer flange member 55G may be prevented from rotation relative to the motor housing 310. Therefore, as the rotational shaft 42 rotates, the female thread hole 49 of the rotational shaft 42 may rotate relative to the male thread portion 631 of the fixed fastening bolt 63G, making it possible to fasten or loosen the threaded engagement between the male thread portion 631 and the female thread hole 49.

The operation knob mechanism 81G may be located adjacent to a base end 37G (left end in FIG. 17) of a rotation drive shaft 36G corresponding to the rotation drive shaft 36 of the first embodiment. In this connection, the base end 37G of the rotation drive shaft 36G may extend leftward beyond the rotatably supporting bearing 371, and the operation knob mechanism 81G may be mounted to the base end 37G. on the left side of the bearing 371. The base end 37G may be formed with a pair of parallel flat surfaces 39G on opposite sides in the diametrical direction for engagement with respect to rotation with an engagement hole 88G formed in an engagement slider 85G that will be described later. The operation knob mechanism 81G may generally include a dial knob 82G, the engagement slider 85G, and an engagement releasing spring 93G. The dial knob 82G may be formed so as to be rotatable about the rotation axis of the rotation drive shaft 36G. More specifically, the dial knob 82G may be rotatably supported by a detachment preventing portion 31G provided on the motor housing 310. The detachment preventing portion 31G may slidably rotatably engage an outer peripheral portion 83G of the dial knob 82G while it prevents detachment of the dial knob 82G in the axial direction therefrom.

The dial knob 82G may serve as a rotatable dial, and may be provided with a plurality of recesses 84G that are spaced equally from each other in the circumferential direction for engagement by fingers of the operator. The interior of the dial knob 82G may be formed as an appropriate hollow structure capable of accommodating the engagement slider 85G and the engagement releasing spring 93G. The engagement slider 85G may have a slider main body 86G and an operation member 90G. The slider main body 86G may be formed to have a shape of a substantially flat plate. The slider main body 86G may be supported within the dial knob 82G so as to be slidably movable in a diametrical direction with respect to the rotation axis. An engagement releasing hole 87G and an engagement hole 88G may be formed in series with each other in a substantially central portion of the slider main body 86G and may extend throughout the thickness thereof.

The engagement releasing hole 87G and the engagement hole 88G may be arranged so as to be connected to each other in a sliding direction of the slider main body 86G. More specifically, the engagement releasing hole 87G may be positioned on the side of a first end 861G of the slider main body 86G, and the engagement hole 88G may be positioned on the side of a second end 862G opposite to the first end 861G of the slider main body 86G. The left end 37G of the rotation drive shaft 36G may be inserted into the engagement releasing hole 87G or the engagement hole 88G according to the sliding movement of the slider main body 86G. When the left end 37G of the rotation drive shaft 36G is inserted into the engagement releasing hole 87G, the left end 37G of the rotation drive shaft 36G may free to rotate within the engagement releasing hole 87G. More specifically, the engagement releasing hole 87G may be formed as a circular hole having a diameter slightly larger than the outer diameter of the rotation drive shaft 36G. On the other hand, the engagement hole 88G may have a shape substantially conforming to the shape of the left end 37G having the pair of parallel flat surfaces 39G on opposite sides in the diametrical direction. Therefore, when the left end 37G is inserted into the engaging hole 88G, the left end 37G may engage the engaging hole 88G in the rotational direction.

More specifically, the engagement hole 88G may be provided with a pair of parallel flat inner peripheral surfaces 89G that may oppose the pair of parallel flat surfaces 39G. The pair of parallel flat inner peripheral surfaces 89G may contact the pair of parallel flat surfaces 39G to provide engagement between the rotation drive shaft 36G and the slider main body 86G in the rotational direction. An engagement releasing spring 93G may normally urge the slider main body 86G in such a direction that the engagement releasing hole 87G is positioned to receive the left end 37G of the rotation drive shaft 36G. The engagement releasing spring 93G may be a coil spring that may contact an upper end portion 861G of the slider main body 86G to urge the slider main body 86G toward the side of a lower end 862G. In this way, the engagement releasing spring 93G may urge the slider main body 86G to normally keep at a position where left end 37G of the rotation drive shaft 36G is not inserted into the engagement hole 88G but is inserted into the engagement releasing hole 87G.

An operation member 90G may be mounted to the lower end 862G of the slider main body 86G. The operation member 90G may have a groove 91G formed at a portion of the operation member 90G exposed to the outside and configured to facilitate engagement by fingers of the operator. Therefore, the operator can engage his fingers with the groove 91G of the operation member 90G to move the slider main body 86G in an upward direction (i.e., the direction from the side of the lower end 862G toward the side of the upper end 861G) against the urging force of the engagement releasing spring 93G. As the slider main body 86G moves upward, the left end 37G of the rotation drive shaft 36G may move from the engagement releasing hole 87G to the engagement hole 88G. Then, the rotation drive shaft 36G can rotate together with the slider main body 86G, and, at the same time, it can rotate together with the dial knob 82G that supports the slider main body 86G. In this way, if the operator turns the dial knob 82G while he or she presses the operation member 90G upward with fingers, the rotation drive shaft 36G may rotate together with the dial knob 82G. As described previously in connection with the first embodiment, the rotation of the rotation drive shaft 36G may be transmitted to the rotational shaft 42 via the speed reduction gear 41.

As described above, the flange engaging portion 65G may serve as a mechanism for temporarily engaging the fastening bolt 63G and the flange member 55G. With the cutter mounting device 50G constructed as described above, when rotational shaft 42 is rotated while the rotation inhibiting shaft 67G engages the engagement hole 56G to inhibit rotation of the outer flange member 55G, the male thread portion 631 may be fastened into or loosened from the female thread hole 49.

More specifically, when the dial knob 82G is turned to rotate the rotation drive shaft 36G to the right while the rotation inhibiting shaft 67G is engaged with the engagement hole 56G, the rotational shaft 42 may be rotated to the left via the speed reduction gear 41. Then, the male thread portion 631 may be fastened into the female thread hole 49. Therefore, the flange members 53 and 55G may be pressed against the circular cutter B so as to clamp the circular cutter B from the inner and outer (left and right) sides, and, in this state, the circular cutter B may be firmly fixed to the rotational shaft 42. Conversely, when the dial knob 82G is turned to rotate the rotation drive shaft 36G to the left while the rotation inhibiting shaft 67G is engaged with the engagement hole 56G, the rotational shaft 42 may be rotated to the right via the speed reduction gear 41. Then, the male thread portion 631 may be loosened from the female thread hole 49. Therefore, it is possible to remove the fastening bolt 63G from the rotational shaft 42 in order to separate the flange members 53 and 55G from each other for removing the circular cutter B. In this way, the operation device of this embodiment is separated into the flange engaging mechanism 65G and the operation knob mechanism 81G. Therefore, it is possible to avoid an increase in size of the cutting unit 20G at a local position. As a result, the cutting unit 20G can be easily handled. Furthermore, since the rotational shaft 42 is rotated via the speed reduction gear 41, the operational torque for turning the dial knob 82G may be converted to a strong fastening torque for rotating the rotational shaft 42. As a result, even in the case where the operational torque is not so strong, it is possible to generate a strong fastening torque.

The above-described embodiments may be further modified in various ways. For example, the construction of the clamp device 51 may not be limited to that disclosed in the above embodiments. Any other fixing devices may be used for fixing the circular cutter B to the rotational shaft 42. Further, as the bearings 70 and 70B of the first to third embodiments, it may be possible to use any other thrust bearings, such as thrust roller bearings or thrust ball bearings, than thrust needle bearings as long as they can reduce a frictional force.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cutting tools, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A cutting device comprising:
   a cutting unit having a rotational shaft;
   a fixing device configured to fixedly attach a circular cutter to the rotational shaft; and
   an operation device coupled to the fixing device;
   wherein the operation device comprises:
   an operation member configured to apply an operational force to the fixing device for fixation of the circular cutter to the rotational shaft and for releasing fixation of the circular cutter to the rotational shaft; and
   a friction reducing device arranged in an operational force transmission path between the operation member and the fixing device and configured to reduce a frictional force produced between the operation member and the fixing device when the operation member applies the operational force to the fixing device, wherein:
   the operation member comprises an operation shaft and an operation knob,
   the operation shaft is coupled to the rotational shaft, so that the operation shaft is coaxially rotatable relative to the rotational shaft and movable relative to the rotational shaft in an axial direction of the rotational shaft,
   the operation knob has an outer portion defining an outer peripheral surface and an inner portion including an engaging portion engaging the operation shaft in the rotational direction,
   the outer portion and the inner portion are connected to each other and extend coaxial with each other in the axial direction,
   the friction reducing device comprises a bearing coaxially fitted on the operation shaft,
   an engaging device is disposed between an outer peripheral surface of the operation shaft and an inner peripheral surface of the inner portion of the operation knob and is configured to inhibit movement of the inner portion of the operation knob away from the rotational shaft in a first direction along the axial direction,
   the bearing contacts a part of an outer peripheral portion of the operation shaft in the axial direction,
   the inner portion of the operation knob has an end portion in a second direction, which is along the axial direction and opposite to the first direction, and
   the end portion of the inner portion of the operation knob is directly opposed to and abuts the bearing in the axial direction when the operation knob is moved in the axial direction during rotation of the operation knob.

2. The cutting device according to claim 1, wherein:
   the operation shaft is movable relative to the rotational shaft in the axial direction toward and away from the fixing device as the operation knob rotates.

3. The cutting device according to claim 2, wherein the bearing is a rolling bearing arranged between the operation member and the fixing device in the axial direction.

4. The cutting device according to claim 3, wherein the rolling bearing is a thrust needle bearing.

5. The cutting device according to claim 2, wherein:
   the operation device further comprises a thread engaging member threadably engaged with the rotational shaft, so that the thread engaging member moves in the axial direction as the thread engaging member rotates about an axis of the rotational shaft;
   the operation member is coupled to the thread engaging member, so that the operation member moves together with the thread engaging member in the axial direction as the operation member rotates; and
   the operation member is configured to be manually rotatable.

6. The cutting device according to claim 5, wherein:
   the operation device further comprises a pressure applying member rotatable relative to the operation member about the axis of the rotational shaft and is axially opposed to the fixing device; and
   the friction reducing device is arranged between the operation member and the pressure applying member.

7. The cutting device according to claim 5, further comprising:
   an operational force control device coupled to the operation device and operable to shift an axial position of the operation member to increase or decrease the operational force applied to the fixing device.

8. The cutting device according to claim 7, wherein:
   the operation member is movable relative to the thread engaging member between a first position and a second position spaced from the first position in the axial direction away from the fixing device;
   the operational force control device comprises:
   a spring configured to apply an urging force to the operation member in the axial direction toward the first position so as to retain the operation member at the first position; and
   a control member operable to shift the operation member from the first position to the second position against an urging force of the spring.

9. The cutting device according to claim 6, further comprising:
   the operation device further includes a wedge mechanism including a wedge member movable between a lock position and a lock releasing position;
   wherein the wedge member engages the pressure applying member so as to press the pressure applying member against the fixing device when the wedge member is positioned at the lock position;
   the friction reducing device comprises a wedge control device operable to move the wedge member from the lock position to the lock releasing position in response to the rotation of the operation member in a direction for releasing fixation of the fixing device.

10. The cutting device according to claim 2, wherein the operation member is configured to be manually rotatable and is also configured to be rotatable by using a wrench.

11. The cutting device according to claim 10, wherein:
    the operation knob is coupled to the operation shaft so as to be rotatable together with the operation shaft; and
    the operation knob has an outer peripheral portion configured to be engageable with fingers of a user.

12. The cutting device according to claim 11, wherein:
    the operation shaft has an axial end on a side away from the rotational shaft; and
    an operation hole capable of engaging the wrench is formed in the axial end of the operation shaft.

13. The cutting device according to claim 11, wherein the friction reducing device is disposed within a radial space defined between the outer peripheral portion of the operation knob and the operation shaft.

14. The cutting device according to claim 13, wherein:
the operation device further comprises a pressing member that is coaxially rotatable fitted on the operation shaft; and
the bearing is axially interposed between the operation knob and the pressing member.

15. The cutting device according to claim 1, wherein:
the operation device further comprises a pressing member;
the bearing is interposed between the inner portion of the operation knob and the pressing member in the axial direction; and
a movement prevention device is provided between the operation shaft and the pressing member and is configured to prevent movement of the pressing member in the second direction, so that the movement in the second direction of the bearing and the inner portion of the operation knob is prevented by the movement prevention device via the pressing member.

16. The cutting device according to claim 1, wherein:
the operation shaft includes a first shaft portion on a side of the first direction, a second shaft portion on a side of the second direction, and an intermediate shaft portion between the first shaft portion and the second shaft portion;
an outer diameter of the first shaft portion is larger than an outer diameter of the intermediate shaft portion, so that a first stepped portion is formed between the first shaft portion and the intermediate shaft portion, the first stepped portion having a first surface extending substantially in a radial direction and oriented in the second direction;
the outer diameter of the intermediate shaft portion is larger than an outer diameter of the second shaft portion, so that a second stepped portion is formed between the intermediate shaft portion and the second shaft portion, the second stepped portion having a second surface extending substantially in a radial direction and oriented in the second direction;
the inner portion of the operation knob includes a first inner portion and a second inner portion respectively fitted on the first shaft portion and the intermediate shaft portion;
the engaging device comprises the first stepped portion of the operation shaft, so that the second inner portion is prevented from moving in the first direction by the first stepped portion;
the bearing is in contact with the second surface of the second stepped portion, so that the bearing is prevented from moving in the first direction; and
the second inner portion of the operation knob has an end portion in the second direction, the end portion has an end surface directly facing the bearing in the axial direction and positioned substantially within a same plane as the second surface of the second stepped portion of the operation shaft.

17. The cutting device according to claim 1, wherein the operation knob further comprises a connecting portion extending in a radial direction and connecting an end portion in the first direction of the outer portion and an end portion in the first direction of the inner portion.

18. The cutting device according to claim 1, wherein the inner portion of the operation knob includes an outer peripheral surface facing the outer portion, and a diameter of the outer peripheral surface is substantially equal to an outer diameter of the bearing.

19. A cutting device comprising:
a cutting unit having a rotational shaft;
a fixing device configured to fixedly attach a circular cutter to the rotational shaft; and
an operation device coupled to the fixing device;
wherein the operation device comprises:
an operation member configured to apply an operational force to the fixing device for fixation of the circular cutter to the rotational shaft and for releasing fixation of the circular cutter to the rotational shaft; and
a friction reducing device arranged in an operational force transmission path between the operation member and the fixing device and configured to reduce a frictional force produced between the operation member and the fixing device when the operation member applies the operational force to the fixing device, wherein:
the operation member comprises an operation shaft and an operation knob,
the operation shaft is coupled to the rotational shaft, so that the operation shaft is coaxially rotatable relative to the rotational shaft and movable relative to the rotational shaft in an axial direction of the rotational shaft,
the operation knob has an outer portion defining an outer peripheral surface and an inner portion including an engaging portion engaging the operation shaft in the rotational direction,
the outer portion and the inner portion are connected to each other and extend coaxial with each other in the axial direction,
the friction reducing device comprises a bearing coaxially fitted on the operation shaft,
an engaging device is disposed between an outer peripheral surface of the operation shaft and an inner peripheral surface of the inner portion of the operation knob and is configured to inhibit movement of the inner portion of the operation knob away from the rotational shaft in a first direction along the axial direction,
the bearing contacts a part of an outer peripheral portion of the operation shaft in the axial direction,
the inner portion of the operation knob has an end portion in a second direction, which is along the axial direction and opposite to the first direction,
the end portion of the inner portion of the operation knob is directly opposed to the bearing in the axial direction,
the operation device further comprises a pressing member that is coaxially rotatable fitted on the operation shaft, and
the bearing is axially interposed between the operation knob and the pressing member.

20. A cutting device comprising:
a cutting unit having a rotational shaft;
a fixing device configured to fixedly attach a circular cutter to the rotational shaft; and
an operation device coupled to the fixing device;
wherein the operation device comprises:
an operation member configured to apply an operational force to the fixing device for fixation of the circular cutter to the rotational shaft and for releasing fixation of the circular cutter to the rotational shaft; and
a friction reducing device arranged in an operational force transmission path between the operation member and the fixing device and configured to reduce a frictional force produced between the operation member and the fixing device when the operation member applies the operational force to the fixing device, wherein:
the operation member comprises an operation shaft and an operation knob, the operation shaft is coupled to the rotational shaft, so that the operation shaft is coaxially rotatable relative to the rotational shaft and movable relative to the rotational shaft in an axial direction of the rotational shaft, the operation knob has an outer portion defining an outer peripheral surface and an inner portion including an engaging portion engaging the operation shaft in the rotational direction, the outer portion and the inner portion are connected to each other and extend coaxial with each other in the axial direction, the friction reducing device comprises a bearing coaxially fitted on the operation shaft, an engaging device is disposed between an outer peripheral surface of the operation shaft and an inner peripheral surface of the inner portion of the operation knob and is configured to inhibit movement of the inner portion of the operation knob away from the rotational shaft in a first direction along the axial direction, the bearing contacts a part of an outer peripheral portion of the operation shaft in the axial direction, the inner portion of the operation knob has an end portion in a second direction, which is along the axial direction and opposite to the first direction, and the end portion of the inner portion of the operation knob is directly opposed to and abutting the bearing in the axial direction.

* * * * *